United States Patent
Meguro et al.

(10) Patent No.: US 8,206,844 B2
(45) Date of Patent: Jun. 26, 2012

(54) BATTERY AND CENTER PIN

(75) Inventors: Takeshi Meguro, Fukushima (JP);
Yoshihiro Dokko, Fukushima (JP);
Hiroyuki Suzuki, Fukushima (JP);
Tadashi Miebori, Fukushima (JP);
Shinji Hatake, Fukushima (JP); Yuzuru Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 1098 days.

(21) Appl. No.: 11/718,844

(22) PCT Filed: Nov. 1, 2005

(86) PCT No.: PCT/JP2005/020106
§ 371 (c)(1),
(2), (4) Date: Jun. 22, 2007

(87) PCT Pub. No.: WO2006/049167
PCT Pub. Date: May 11, 2006

(65) Prior Publication Data
US 2007/0269711 A1  Nov. 22, 2007

(30) Foreign Application Priority Data

Nov. 8, 2004 (JP) ................. 2004-323996
Mar. 18, 2005 (JP) ................. 2005-080445

(51) Int. Cl.
*H01M 10/40* (2006.01)
*H01M 10/04* (2006.01)
*H01M 10/38* (2006.01)
(52) U.S. Cl. ................ 429/94; 429/130; 429/164
(58) Field of Classification Search ............ 429/164, 429/94, 130, 194
See application file for complete search history.

(56) References Cited

U.S. PATENT DOCUMENTS
6,040,086 A * 3/2000 Yoshida et al. ............. 429/211

FOREIGN PATENT DOCUMENTS

| | | |
|---|---|---|
| JP | 8 255631 | 10/1996 |
| JP | 8 273697 | 10/1996 |
| JP | 11-224689 | * 8/1999 |
| JP | 3178586 | 4/2001 |
| JP | 3286880 | 3/2002 |
| JP | 2004 111150 | 4/2004 |

OTHER PUBLICATIONS

Office Action mailed Jan. 10, 2012, in Japanese Patent Application No. 2006-542401.

* cited by examiner

*Primary Examiner* — Helen O Conley
(74) *Attorney, Agent, or Firm* — Oblon, Spivak, McClelland, Maier & Neustadt, L.L.P.

(57) ABSTRACT

A battery with improved safety that can more surely short-circuit electrodes when flattened out by the external force is provided. A center pin (30) is inserted in the center of a spirally wound electrode body formed by layering and spirally winding a cathode and an anode with a separator in between. The center pin (30) has a cut line (31) provided in the longitudinal direction and a first cutout (32) vertically crossing the cut line (31). When flattened out by the external force, a corner (33) at an intersection of the cut line (31) and the first cutout (32) is projected, and short-circuit is surely generated. Further, it is preferable that the center pin (30) has a second cutout (34) in the direction perpendicular to the cut line (31) in a position facing the cut line (31) in the circumferential direction. It is also preferable that the center pin (30) has a cross sectional shape of an oval or an ellipse, and the cut line (31) is provided in a position where the diameter of the oval or the ellipse is the largest.

22 Claims, 20 Drawing Sheets

BATTERY AND CENTER PIN

TECHNICAL FIELD

The present invention relates to a battery that includes a center pin in the center of a spirally wound electrode body including a strip-shaped cathode, a separator, and an anode, and the center pin used for the battery.

BACKGROUND ART

In recent years, many portable electronic devices such as a combination camera (Videotape Recorder), a mobile phone, and a notebook personal computer have been introduced, and downsizing and weight saving of such devices have been made. Research and development for improving the energy density of the battery used as a portable power source for such electronic devices, in particular the secondary battery as a key device has been actively promoted. Specially, a nonaqueous electrolyte secondary battery (for example, lithium ion secondary battery) provides the higher energy density compared to a lead battery or a nickel cadmium battery that is a conventional aqueous electrolytic solution secondary battery. Therefore, improvement thereof has been considered in respective fields.

Lithium ion secondary batteries with various shapes have been developed. As one thereof, there is a lithium ion secondary battery in which a cathode and an anode are layered and spirally wound with a separator in between, and a center pin is inserted in the center of the spirally wound electrode body. The existing center pin has, for example, as shown in FIG. 34, a cut line 131 in the axis direction of a tubular main body. When an external force is applied to the battery, a main body 130 is flattened out. In the result, the edge of the cut line 131 is opened outward, and the opened portion penetrates the separator, and short-cuts the cathode and the anode. Thereby, battery reaction is blocked, and power generation function is safely deprived.

There is an existing battery in which, for example, a plurality of grooves are provided for the center pin in parallel to the cut line, or a battery in which the edge of the cut line is wave-shaped, so that short-circuit between the electrodes is generated regardless of directions of the applied force (for example, refer to Patent document 1). Further, it is proposed that short-circuit is easily generated extensively by spirally providing a concave portion on the surface of the center pin, or by forming the center pin of a coil spring (for example, refer to Patent document 2 and Patent document 3).

Patent document 1: Japanese Unexamined Patent Application Publication No. 8-255631
Patent document 2: Japanese Patent No. 3178586
Patent document 3: Japanese Unexamined Patent Application Publication No. 8-273697

DISCLOSURE OF THE INVENTION

However, in the battery using the center pin with the foregoing existing structure, there is a problem that deformation in the cut line portion when flattened out by the external force is not sufficient, and therefore the cathode and the anode are not able to be surely short-circuited. An effective means for securing the safety by more surely short-circuiting between the electrodes has been desired.

In view of the foregoing, it is an object of the invention to provide a battery with improved safety that can more surely short-circuit between electrodes when flattened out by the external force, and a center pin used for the battery.

A first battery according to the invention includes: a spirally wound electrode body obtained by layering and spirally winding a cathode and an anode with a separator in between, the cathode has a cathode active material layer on a face of a strip-shaped cathode current collector and the anode has an anode active material layer on a face of a strip-shaped anode current collector; and a tubular center pin that is arranged in a center of the spirally wound electrode body, has a cut line in a longitudinal direction, and has a first cutout crossing the cut line.

A second battery according to the invention includes: a spirally wound electrode body obtained by layering and spirally winding a cathode and an anode with a separator in between, the cathode has a cathode active material layer on a face of a strip-shaped cathode current collector, and an anode has an anode active material layer on a face of a strip-shaped anode current collector; and a tubular center pin that is arranged in a center of the spirally wound electrode body, and provided with a bent slit.

A first center pin and a second center pin according to the invention are respectively used for the first battery and the second battery of the invention.

The "cutout" or the "slit" preferably penetrates the wall face of the center pin. However, the cutout or the slit may be in a so-called concave state in which the thickness of the center pin is thinner than that of the surroundings, and do not penetrate the wall face of the center pin.

In the first battery according to the invention or in the first center pin according to the invention, when the external force is applied to the battery, the center pin is flattened out, and the cut line in the longitudinal direction of the center pin is opened outward. Since the first cutout crosses the cut line, as the cut line is opened outward, a sharp-pointed corner at the intersection of the cut line and the first cutout is opened and projected outward. When the sharp-pointed corner penetrates the separator, the cathode and the anode are surely short-circuited.

In particular, when the cathode is provided with a cathode exposed region in which no cathode active material layer is provided on both faces of the cathode current collector at an end of the cathode current collector on a center side of the spirally wound electrode body, and the anode is provided with an anode exposed region in which no anode active material layer is provided on both faces of the anode current collector at an end of the anode current collector on the center side of the spirally wound electrode body, the both exposed regions of the cathode current collector and the anode current collector with the relatively low resistance are directly short-circuited. That is, no short-circuit is generated through the cathode active material layer with the high resistance. Therefore, temperature rise in the cathode active material layer is prevented.

In the second battery according to the invention or in the second center pin according to the invention, when the external force is applied to the battery, the center pin is flattened out, and the slit is projected outward. When a bent convex portion of the slit penetrates the separator, the cathode and the anode are surely short-circuited.

According to the first battery of the invention or the first center pin of the invention, the first cutout is provided to cross the cut line in the longitudinal direction of the enter pin. Therefore, when flattened out or broken by the external force, the cathode and the anode are surely short-circuited, and the safety is improved.

In particular, when the anode contains an anode active material that can insert and extract an electrode reactant and contains at least one of metal elements and metalloid elements as an element, the energy density of the battery is large, and higher safety is demanded. Therefore, in this case, higher effects can be obtained.

Further, when a second cutout is provided in the direction crossing the cut line in a position deviated from the cut line in the circumferential direction, the edge portion of the second cutout is opened outward in addition to the intersection of the cut line and the first cutout. Therefore, the cathode and the anode can be surely short-circuited. Further, by changing the size, the number and the like of the second cutouts, the strength of the center pin can be adjusted.

In addition, when the center pin has a cross sectional shape of an oval or an ellipse, and the cut line is provided where a diameter of the oval or the ellipse is the largest, even if the force is applied from the same direction as that of the maximum diameter of the oval or the ellipse, the center pin is rotated in the spirally wound electrode body, is easily flattened out in the direction of the minimum diameter of the oval or the ellipse, and thus the deformation of the center pin can be directed. In the result, regardless of the direction of the applied force, the cut line is not flattened out flatly but opened outward, and short-circuit is surely generated.

According to the second battery of the invention or the second center pin of the invention, the bent slit is provided for the center pin. Therefore, when flattened out or broken by the external force, the cathode and the anode can be surely short-circuited and thereby the safety is improved. Further, when the cuts are uniformly arranged over the entire center pin, regardless of the direction of the applied external force, the cathode and the anode are surely short-circuited and thereby the safety can be improved.

BEST MODE FOR CARRYING OUT THE INTENTION

Embodiments of the invention will be hereinafter described in detail with reference to the drawings. For each element in the figures, the shape, the size, and the arrangement relation are schematically shown to the degree with which the invention can be understood, and the shape, the size, and the arrangement relation are different from those actually used.

First Embodiment

Figure 1:
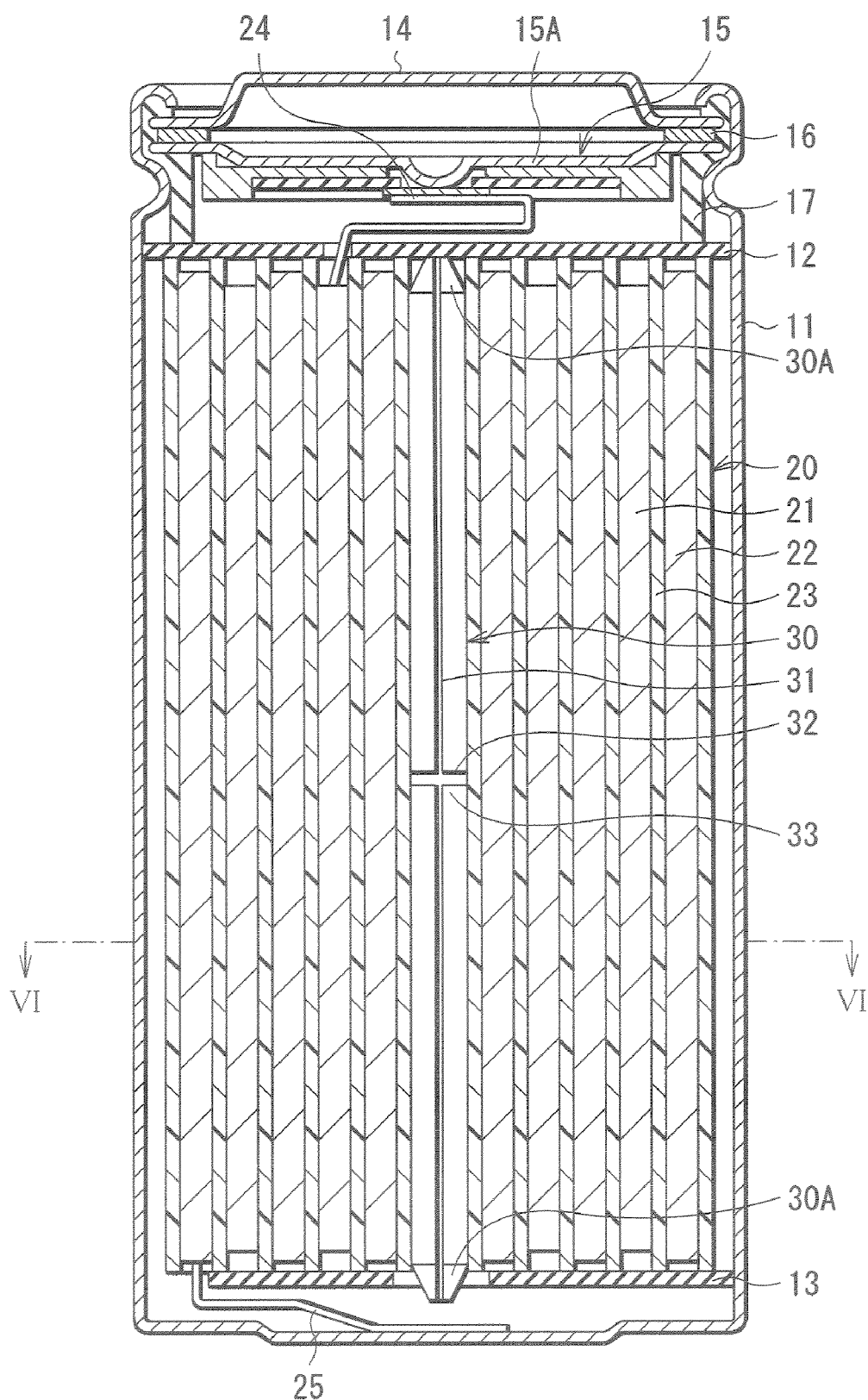
FIG. 1 is a cross section showing a structure of a secondary battery according to a first embodiment of the invention.

FIG. 1 shows a cross sectional structure of a secondary battery according to a first embodiment of the invention. The secondary battery is a so-called cylindrical battery, and has a spirally wound electrode body 20 inside a battery can 11 in the shape of a approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 is respectively arranged perpendicular to the spirally winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby hermetically sealed. The battery cover 14 is, for example, made of a material similar to that of the battery can 11. The safety valve mechanism 15 is electrically connected to the battery cover 14 with the PTC device 16 in between. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits the current by increasing the resistance to prevent abnormal heat generation by the large current. The gasket 17 is made of, for example, an insulating material and its surface is coated with asphalt.

In the spirally wound electrode body 20, a cathode 21 and an anode 22 are layered and spirally wound with a separator 23 in between, and a center pin 30 is inserted in the center thereof. A cathode lead 24 made of aluminum (Al) or the like is connected to the cathode 21 of the spirally wound electrode body 20. An anode lead 25 made of nickel or the like is connected to the anode 22. The cathode lead 24 is electrically connected to the battery cover 14 by being welded to the safety valve mechanism 15. The anode lead 25 is welded and electrically connected to the battery can 11.

Figure 2:
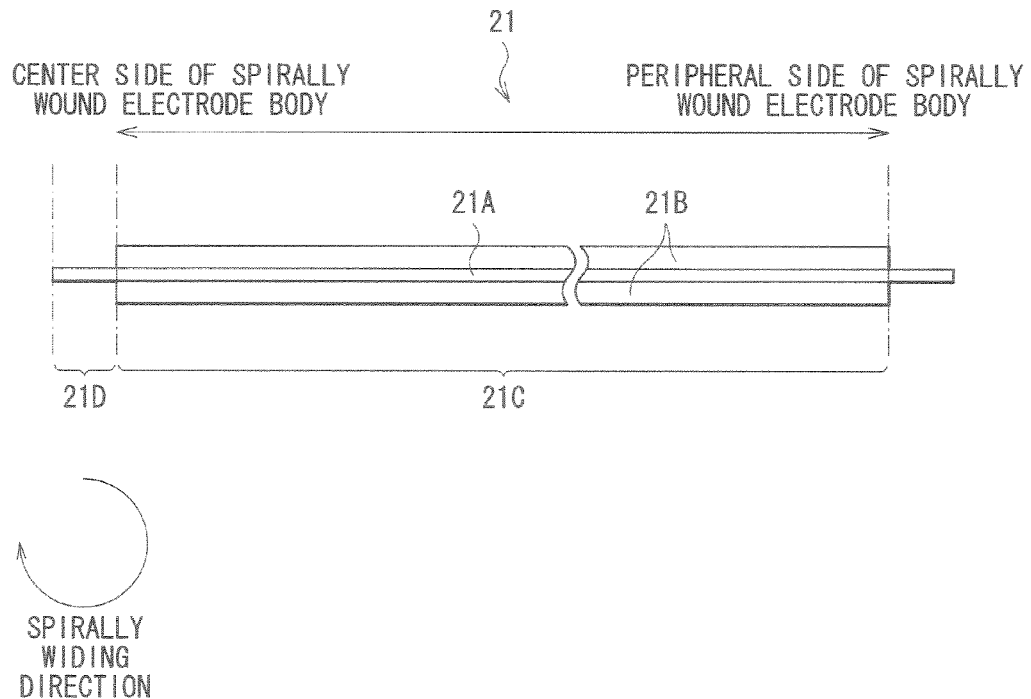
FIG. 2 is a cross section showing a structure of a cathode shown in FIG. 1 before spirally wound.

FIG. 2 shows a cross sectional structure of the cathode 21 shown in FIG. 1 before being spirally wound. In the cathode 21, a cathode active material layer 21B is provided on the both faces of a strip-shaped cathode current collector 21A. More specifically, the cathode 21 has a cathode coated region 21C in which the cathode active material layer 21B exists on the outer circumferential face side and the inner circumferential face side of the cathode current collector 21A. In addition, in the cathode 21, the end of the center side of the spirally wound electrode body is a cathode exposed region 21D, that is, a region in which no cathode active material layer 21B is provided on the both faces of the cathode current collector 21A and the both faces of the cathode current collector 21A are exposed.

The cathode current collector 21A is, for example, about 5 μm to 50 μm thick, and is made of a metal foil such as an aluminum foil, a nickel foil, and a stainless foil.

The cathode active material layer 21B contains, for example, as a cathode active material, one or more cathode materials capable of inserting and extracting lithium as an electrode reactant. If necessary, the cathode active material layer 21B may also contain a conductive material such as a carbon material and a binder such as polyvinylidene fluoride. As the cathode material capable of inserting and extracting lithium, for example, a metal sulfide containing no lithium such as titanium sulfide ($TiS_2$), molybdenum sulfide ($MoS_2$), niobium selenide ($NbSe_2$), and vanadium oxide ($V_2O_5$), a metal selenide, a metal oxide, or a lithium-containing compound containing lithium can be cited.

Specially, the lithium-containing compound is preferable since some lithium-containing compounds can provide the high voltage and the high energy density. As such a lithium-containing compound, for example, a complex oxide containing lithium and a transition metal element, or a phosphate compound containing lithium and a transition metal element can be cited. In particular, a compound containing at least one of cobalt (Co), nickel, and manganese (Mn) is preferable, since such a compound can provide the higher voltage. The chemical formula thereof can be expressed by, for example, $Li_xMIO_2$ or $Li_yMIIPO_4$. In the formulas, MI and MII represent one or more transition metal elements. Values of x and y vary according to charge and discharge states of the battery, and the values of x and y are generally in the range of $0.05 \leq x \leq 1.10$ and $0.05 \leq y \leq 1.10$.

As a specific example of the complex oxide containing lithium and a transition metal element, a lithium cobalt complex oxide ($Li_xCoO_2$), a lithium nickel complex oxide ($Li_xNiO_2$), a lithium nickel cobalt complex oxide ($Li_xNi_{1-z}Co_zO_2$ ($z<1$)), lithium manganese complex oxide having a spinel structure ($LiMn_2O_4$) or the like can be cited. Specially, the complex oxide containing nickel is preferable, since such a complex oxide can provide the high capacity and the superior cycle characteristics. As a specific example of the phosphate compound containing lithium and a transition metal element, for example, lithium iron phosphate compound ($LiFePO_4$) or a lithium iron manganese phosphate compound ($LiFe_{1-v}Mn_vPO_4$ ($v<1$)) can be cited.

Figure 3:
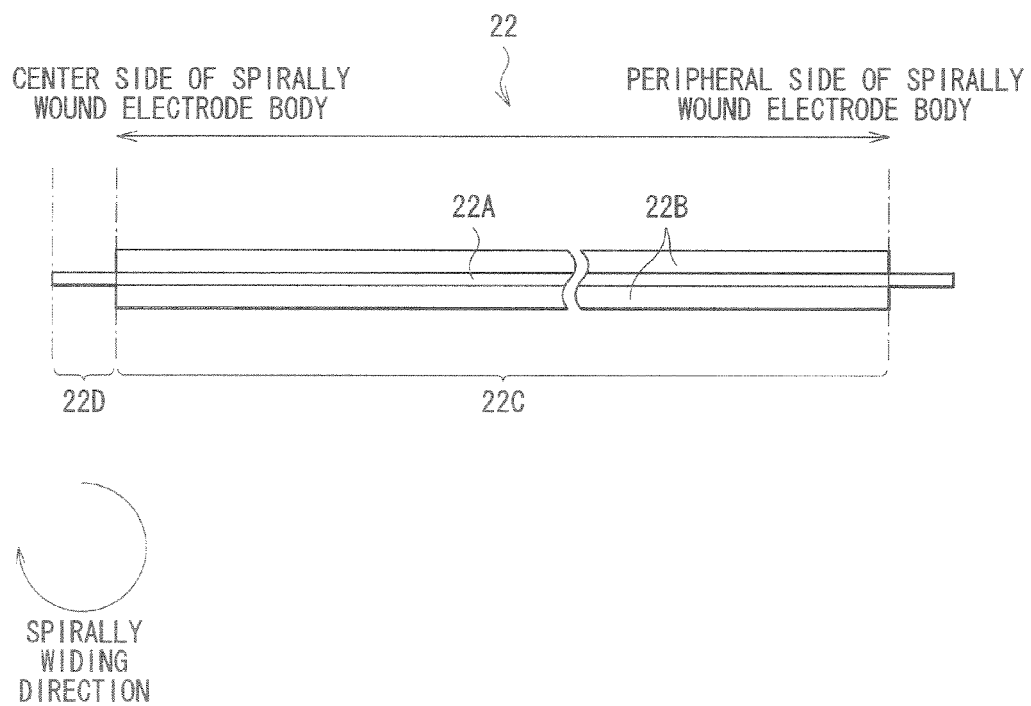
FIG. 3 is a cross section showing a structure of an anode shown in FIG. 1 before spirally wound.

FIG. 3 shows a structure of the anode 22. In the anode 22, an anode active material layer 22B is provided on the both faces of a strip-shaped anode current collector 22A. More specifically, the anode 22 has an anode coated region 22C in which the anode active material layer 22B exists on the outer circumferential face side and the inner circumferential face side of the anode current collector 22A. In addition, the anode 21 has an anode exposed region 22D in which no anode active material layer 22B is provided on the both faces of the anode current collector 22A and the both faces of the anode current collector 22A are exposed at the end of the center side of the spirally wound electrode body.

The anode current collector 22A is made of, for example, a metal foil such as a copper foil, a nickel foil, and a stainless foil. The anode current collector 22A is, for example, about 5 μm to 50 μm thick.

The anode active material layer 22B contains, for example, an anode active material. If necessary, the anode active material layer 22B may contain other material such as an electrical conductor and a binder. As the anode active material, for example, an anode material that is capable of inserting and extracting lithium as an electrode reactant and contains at least one of metal elements and metalloid elements as an element can be cited. Such an anode material is preferably used, since thereby the high energy density can be obtained. As such an anode material, a simple substance, an alloy, or a compound of metal elements or metalloid elements, or a material having one or more phases thereof at least in part can be cited. In the invention, alloys also include an alloy containing one or more metal elements and one or more metalloid elements, in addition to an alloy including two or more metal elements. Further, an alloy may contain nonmetallic elements. The texture thereof may be a solid solution, a eutectic crystal (eutectic mixture), an intermetallic compound, or a texture in which two or more of the foregoing textures coexist.

As such a metal element or such a metalloid element composing the anode material, for example, a metal element or a metalloid element capable of forming an alloy with lithium can be cited. More specifically, magnesium (Mg), boron (B), aluminum (Al), gallium (Ga), indium (In), silicon, germanium (Ge), tin, lead (Pb), bismuth (Bi), cadmium (Cd), silver (Ag), zinc (Zn), hafnium (Hf), zirconium (Zr), yttrium (Y), palladium (Pd), platinum (Pt) or the like can be cited.

Specially, as the anode material, a compound containing a metal element or a metalloid element of Group 14 in the long period periodic table as an element is preferable. A material containing at least one of tin and silicon as an element is particularly preferable. Tin and silicon have a high ability to insert and extract lithium and provide the high energy density. More specifically, a simple substance, a alloy, or a compound of silicon; a simple substance, an alloy, or a compound of tin; or a material having one or more phases thereof at least in part can be cited.

As an alloy of tin, for example, an alloy containing at least one selected from the group consisting of silicon, nickel, copper, iron (Fe), cobalt (Co), manganese (Mn), zinc (Zn), indium (In), silver (Ag), titanium (Ti), germanium (Ge), bismuth (Bi), antimony (Sb), and chromium (Cr) as a second element other tin can be cited. As an alloy of silicon, for example, an alloy containing at least one selected from the group consisting of tin, nickel, copper, iron, cobalt, manganese, zinc, indium, silver, titanium, germanium, bismuth, antimony, and chromium as a second element other than silicon can be cited.

As a compound of tin or a compound of silicon, for example, a compound containing oxygen (O) or carbon (C) can be cited. In addition to tin or silicon, the compound may contain the foregoing second element.

Specially, as such an anode material, a CoSnC-containing material containing tin, cobalt, and carbon as an element in which the carbon content is from 9.9 wt % to 29.7 wt %, and the ratio of cobalt to the total of tin and cobalt is from 30 wt % to 70 wt % is preferable. In such a composition range, the high energy density can be obtained, and the superior cycle characteristics can be obtained.

The CoSC-containing material may further contain other elements if necessary. As other element, for example, silicon, iron, nickel, chromium, indium, niobium (Nb), germanium, titanium, molybdenum (Mo), aluminum (Al), phosphorus (P), gallium (Ga), or bismuth is preferable. Two or more thereof may be contained, since the capacity or the cycle characteristics can be thereby further improved.

The CoSnC-containing material has a phase containing tin, cobalt, and carbon. The phase preferably has a structure with low crystallinity or an amorphous structure. Further, it is preferable that in the CoSnC-containing material, at least part of carbon as the element is bonded to the metal element or the metalloid element as other element. The reason thereof is as follows. Lowered cycle characteristics may be caused by cohesion or crystallization of tin or the like. Such cohesion or crystallization can be prevented by bonding carbon to other element.

As a measuring method for examining bonding state of the elements, for example. X-ray Photoelectron Spectroscopy (XPS) can be cited. In XPS, in the case of graphite, the peak of 1 s orbital of carbon (C1s) is observed at 284.5 eV in the apparatus in which energy calibration is made so that the peak of 4f orbital of gold atom (Au4f) is obtained in 84.0 eV. In the case of surface contamination carbon, the peak is observed at 284.8 eV. Meanwhile, in the case of higher electric charge density of the carbon element, for example, when carbon is bonded to the metal element or the metalloid element, the peak of C1s is observed at the region lower than 284.5 eV. That is, when the peak of the composite wave of C1s obtained for the CoSnC-containing material is observed at the region lower than 284.5 eV, at least part of carbon contained in the CoSnC-containing material is bonded to the metal element or the metalloid element as other element.

In XPS measurement, for example, the peak of C1s is used for correcting the energy axis of spectrums. Since surface contamination carbon generally exists on the surface, the peak of C1s of the surface contamination carbon is set to in 284.8 eV, which is used as the energy reference. In XPS measurement, the waveform of the peak of C1s is obtained as a shape including the peak of the surface contamination carbon and the peak of carbon in the CoSnC-containing material. Therefore, by analyzing with the use of a commercially available software or the like, the peak of the surface contamination carbon and the peak of carbon in the CoSnC-containing material are separated. In the analysis of the waveform, the position of the main peak existing on the lowest bound energy side is used as the energy reference (284.8 eV).

As the anode active material, a carbon material such as natural graphite, artificial graphite, non-graphitizable carbon, and graphitizable carbon may be also used. The carbon material is preferably used, since the superior cycle characteristics can be obtained. Further, as the anode active material, lithium metal can be also cited. As the anode active material, one of the foregoing may be used singly, or two or more thereof may be used by mixing them.

The separator 23 shown in FIG. 1 is made of, for example, a porous film made of a polyolefin material such as polypropylene and polyethylene, or a porous film made of an inorganic material such as a ceramics unwoven cloth. The separator 23 may have a structure in which two or more of the foregoing porous films are layered.

An electrolytic solution as a liquid electrolyte is impregnated in the separator 23. The electrolytic solution contains, or example, a solvent and a lithium salt as an electrolyte salt. The solvent is for dissolving and dissociating the electrolyte salt. As the solvent, for example, propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, ester acetate, ester butyrate, propionate ester or the like can be cited. The solvent may be used singly, or two or more thereof may be used by mixing.

As the lithium salt, for example, $LiClO_4$, $LiAsF_6$, $LiPF_6$, $LiBF_4$, $LiB(C_6H_5)_4$, $CH_3SO_3Li$, $CF_3SO_3Li$, LiCl, LiBr or the like can be cited. As the lithium salt, one of the foregoing may be used singly, or two or more thereof may be used by mixing them.

Figure 4:
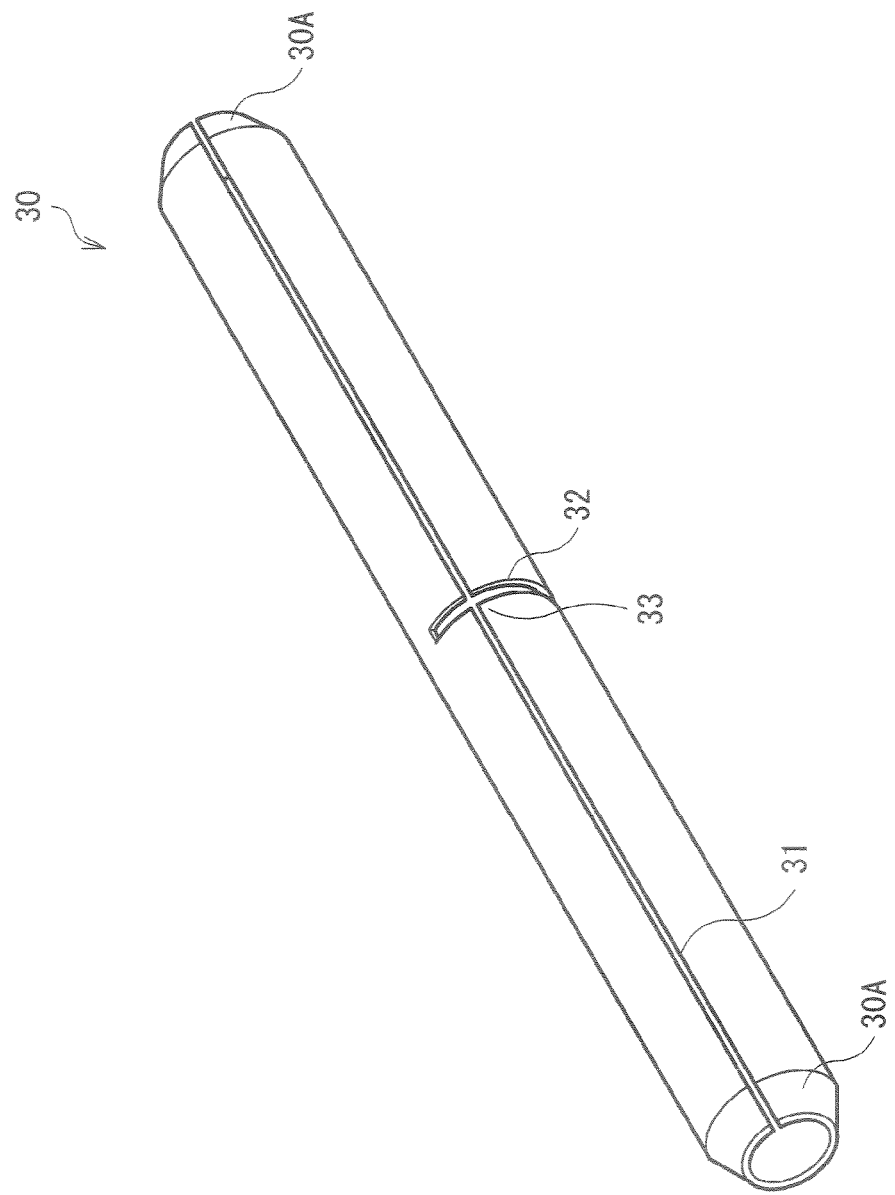
FIG. 4 is a perspective view showing an example of a structure of a center pin.
Figure 5:
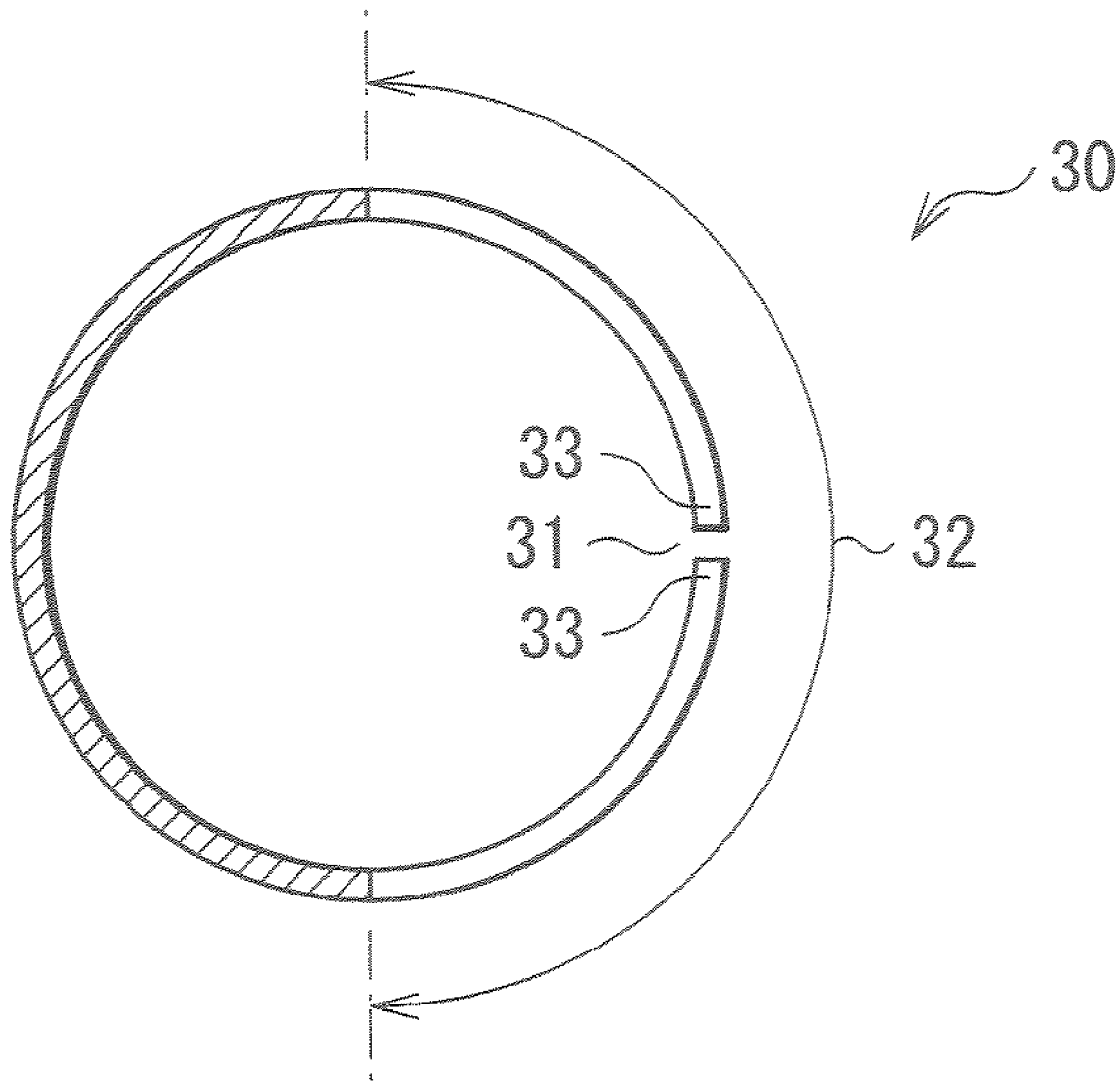
FIG. 5 is a cross section showing a structure taken along a line passing the center of a first cutout of the center pin shown in FIG. 4.

FIG. 4 shows a structure of the center pin 30 shown in FIG. 1. FIG. 5 shows a cross sectional structure of the center pin 30. The center pin 30 is formed into a tubular shape by, for example, rolling a thin strip-shaped plate. The center pin 30 is cylindrical being, for example, 3.0 mm in diameter. The both ends of the center pin 30 are provided with slanted portions 30A to easily insert the center pin 30 in the center of the foregoing spirally wound electrode body 20 in the after-mentioned manufacturing process.

Figure 6:
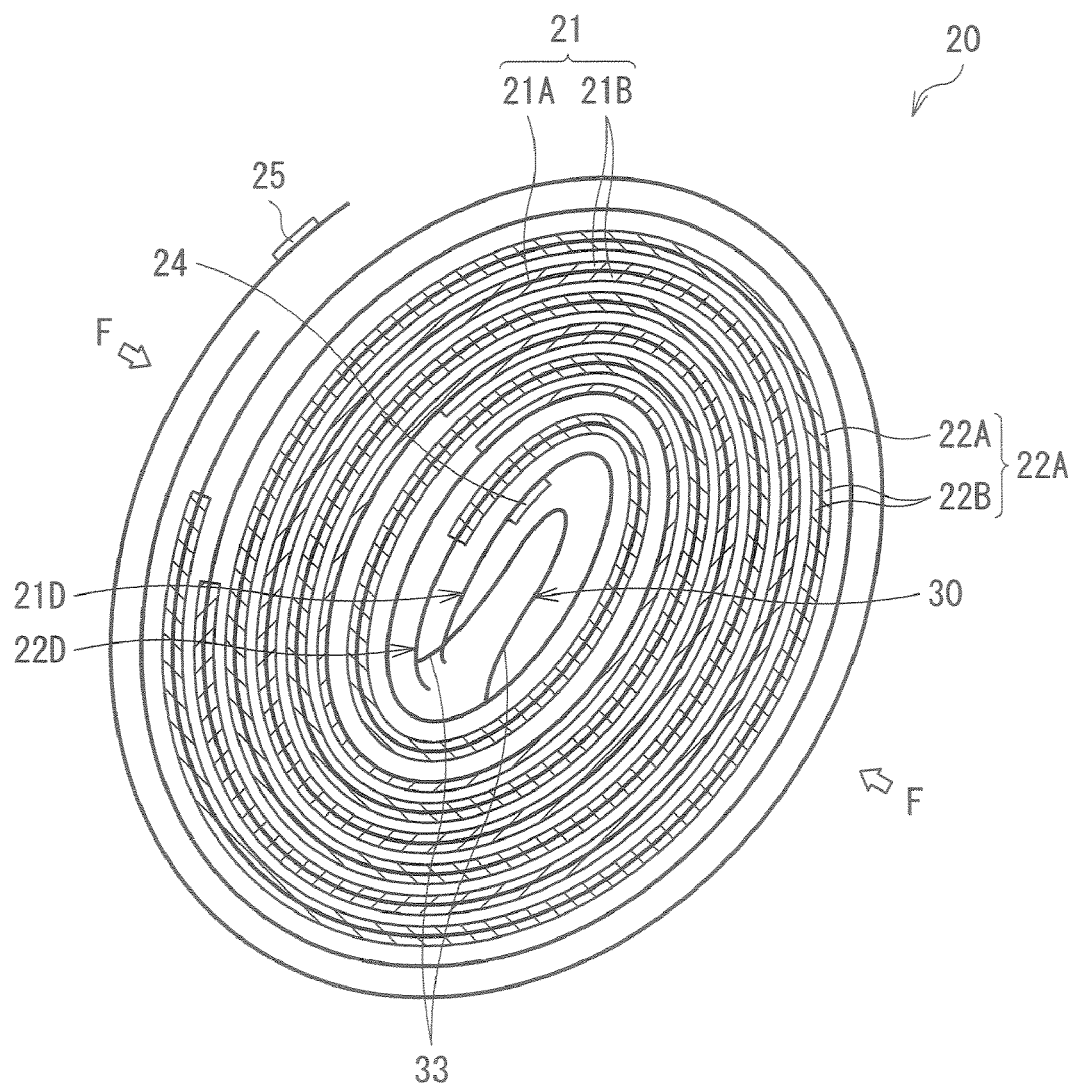
FIG. 6 is a view for explaining an operation of the center pin when the secondary battery shown in FIG. 1 is flattened out, and a cross section taken along line VI-VI of FIG. 1.

The center pin 30 has a cut line 31 from one end to the other end in the longitudinal direction. Further, the center pin 30 is formed with a first cutout 32 to vertically cross the cut line 31. At the intersection thereof, a corner 33 is provided. Thereby, for example, as show in FIG. 6, when the secondary battery is flattened out by an external force F, the corner 33 at the intersection of the in cut line 31 and the first cutout 32 is projected to open outward and penetrates the separator 23. In the result, the cathode 21 and the anode 22 can be surely short-circuited.

In particular, when the anode 22 contains the anode active material that can insert and extract the electrode reactant and contains at least one of the metal elements and the metalloid elements as an element, the battery energy density is large and higher safety is demanded. Therefore, in this case, higher effects can be obtained.

The material and the thickness of the center pin 30 are determined considering the size, the length and the like of the first cutout 32. The material and the thickness of the center pin 30 are set to the degree with which a given strength is retained generally, but when the battery is flattened out by the external force, the center pin 30 is flattened out together and the corner 33 is opened outward to penetrate the separator 23. More specifically, as a material of the center pin 30, for example, stainless steel can be cited. The thickness of the center pin 30 is preferably, for example, from 0.05 mm to 5 mm. In the case of under 0.05 mm, the strength may be lowered. Meanwhile, in the case of more than 5 mm, it is difficult to roll the plate in the tabular shape. The length of the center pin 30 varies according to the dimensions of the secondary battery, but is preferably from 2.5 cm to 8.0 cm, for example.

The cut line 31 is provided by forming a space between opposed long sides of the center pin 30 when the center pin 30 is formed by rolling the thin strip-shaped plate into the tubular shape in the after-mentioned manufacturing step. The width of the cut line 31 is, for example, 0.5 mm.

The length of the first cutout 32, that is, the dimension of the first cutout 32 in the circumferential direction of the center pin 30 is preferably set to the degree with which the corner 33 can be surely projected, and for example, the half circumference of the center pin 30. Further, the width of the first cutout 32, that is, the dimension of the first cutout 32 in the longitudinal direction of the center pin 30 is preferably from 0.1 mm to 2.0 mm. Thereby higher effects can be obtained.

Figure 7:
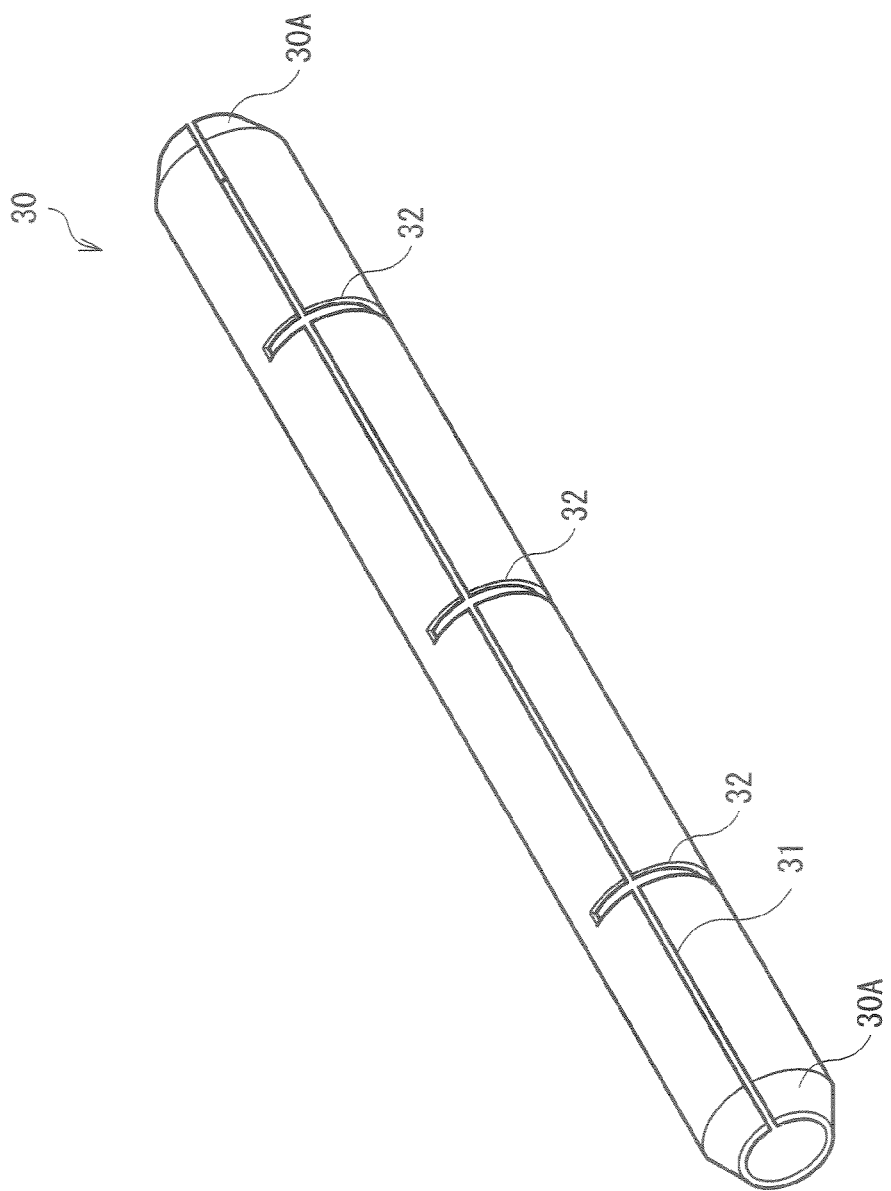
FIG. 7 is a perspective view showing another example of the structure of the center pin.

The number of the first cutouts 32 and the position of the first cutout 32 are not particularly limited. For example, as shown in FIG. 4, one first cutout 32 may be provided in the center of the cut line 31. Otherwise, for example, as shown in FIG. 7, the first cutouts 32 may be provided in the vicinity of the both ends of the cut line 31 in addition to in the center thereof.

Figure 8:
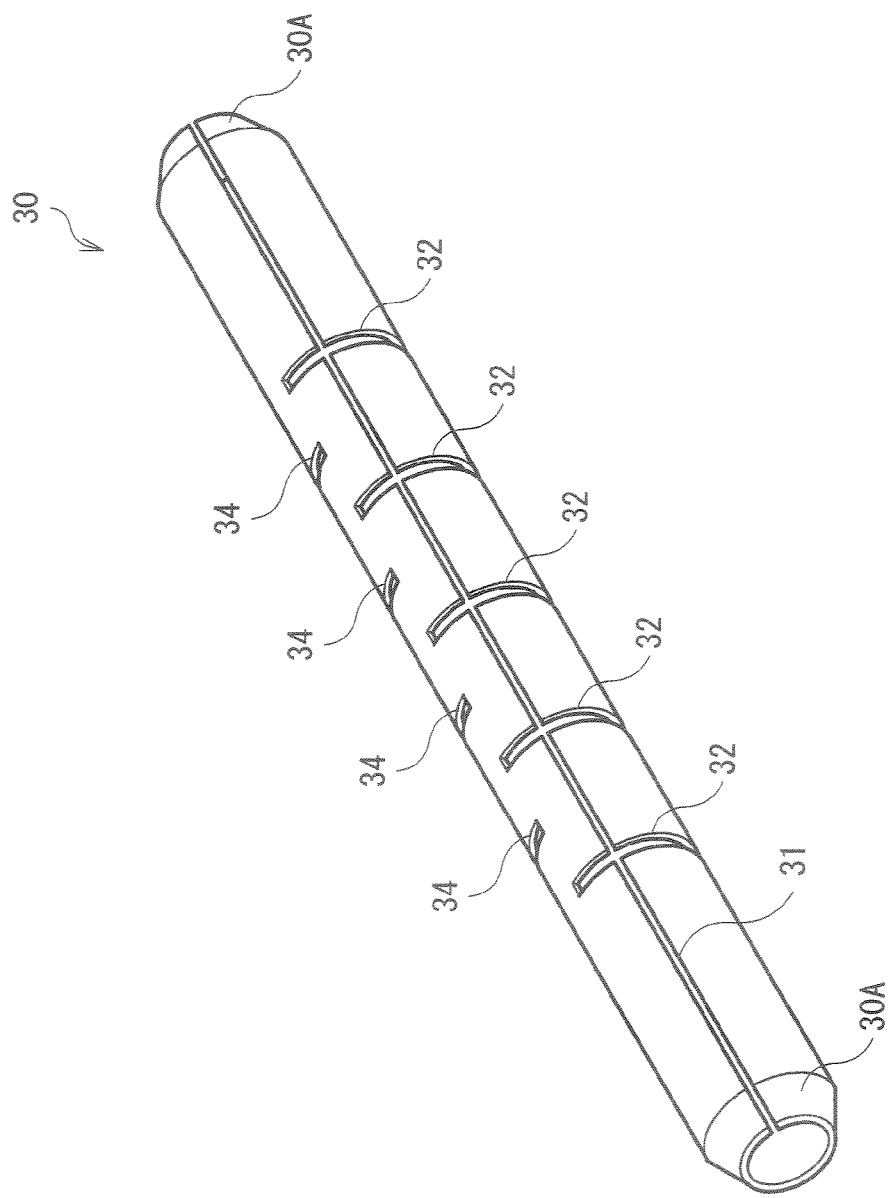
FIG. 8 is a perspective view showing still another example of the structure of the center pin.

Further, in addition to the foregoing first cutout 32, for example, as shown in FIG. 8, the center pin 30 preferably has a second cutout 34 in a position facing the cut line 31 in the circumferential direction. The second cutout 34 is also provided in the direction perpendicular to the cut line 31 as the first cutout 32. Thereby, when the external force is applied, not only the first cutout 32 but also the second cutout 34 is opened outward, penetrates the separator 23, and is pressed against the cathode 21 and the anode 22. Thereby, short-circuit can be more surely generated. Further, by changing the size, the number and the like of the second cutout 34, the strength of the center pin 30 can be adjusted.

The length of the second cutout 34 is set to the degree with which the second cutout 34 can be opened outward when flattened out or broken. For example, the length of the second cutout 34 is set to the half circumference of the center pin 30 as that of the first cutout 32. The width of the second cutout 34 is preferably, for example, from 0.1 mm to 2.0 mm as that of the first cutout 32. The number and the position of the second cutouts 34 can be appropriately determined according to the number and the position of the first cutouts 32, and are not limited particularly.

The secondary battery can be manufactured, for example, as follows. A description will be given of an example in the case that, for example, a secondary battery having the center pin 30 shown in FIG. 8 is manufactured.

First, for example, a cathode material, an electrical conductor, and a binder are mixed to prepare a cathode mixture, which is dispersed in a solvent such as N-methyl-2-pyrrolidone to form paste cathode mixture slurry. Subsequently, the cathode current collector 21A is uniformly coated with the cathode mixture slurry by using a doctor blade, a bar coater or the like, which is dried and compression-molded by a rolling press machine to form the cathode active material layer 21B and thereby forming the cathode 21.

Next, for example, the anode active material and a binder are mixed to prepare an anode mixture, which is dispersed in a solvent such as N-methyl-2-pyrrolidone to form paste anode mixture slurry. Subsequently, the anode current collector 22A is uniformly coated with the anode mixture slurry by using a doctor blade, a bar coater or the like, which is dried and compression-molded by a rolling press machine to form the anode active material layer 22B and thereby forming the anode 22. The rolling press machine may be used while being heated. Further, compression molding may be made several times until an intended physical value is obtained. Furthermore, a press machine other than the rolling press machine may be used.

Subsequently, the cathode lead 25 is attached to the cathode current collector 21A by welding or the like, and the anode lead 26 is attached to the anode current collector 22A by welding or the like. After that, the cathode 21 and the anode 22 are layered with the separator 23 in between, and spirally wound several times in the spirally winding direction shown in FIG. 2 and FIG. 3 to form the spirally wound electrode body 20.

Figure 9:
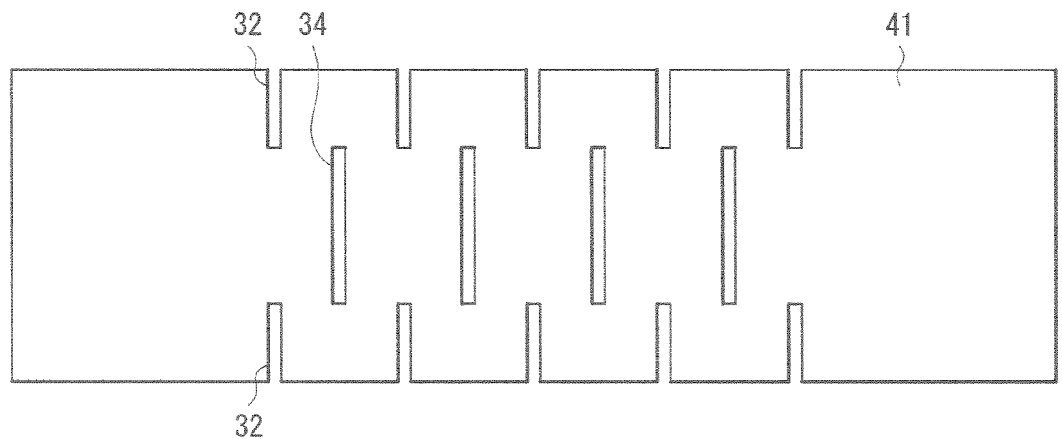
FIG. 9 is a plan view showing a step of a method of manufacturing a secondary battery using the center pin shown in FIG. 8.

Meanwhile, as shown in FIG. 9, a thin strip-shaped plate 41 made of, for example, stainless is prepared. By wire-cutting the plate 41, the first cutout 32 and the second cutout 34 are formed. Subsequently, as shown in FIG. 8, the plate 41 is rolled into the cylindrical shape, the both ends are tapered to provide the slanted portion 30A. Thereby, the center pin 30 is formed.

After the center pin 30 is formed, the center pin 30 is inserted in the center of the spirally wound electrode body 20. Subsequently, the spirally wound electrode body 20 is sandwiched between the pair of insulating plates 12 and 13, the anode lead 25 is welded to the battery can 11, the cathode lead 24 is welded to the safety valve mechanism 15, and the spirally wound electrode body 20 is contained inside the battery can 11. After that, the electrolytic solution is injected into the battery can 11, and impregnated in the separator 23. After that, at the open end of the battery can 11, the battery cover 14, the safety valve mechanism 15, and the PTC device 16 are fixed by being caulked through the gasket 17. The secondary battery shown in FIG. 1 is thereby completed.

In the secondary battery, when charged, for example, lithium ions are extracted from the cathode 21, and are inserted in the anode 22 through the electrolytic solution impregnated in the separator 23. When discharged, for example, lithium ions are extracted from the anode 22, and are inserted in the cathode 21 through the electrolytic solution impregnated in the separator 23. In the secondary battery, the center pin 30 is provided with the cut line 31 in the longitudinal direction, and is provided with the first cutout 32 to vertical cross the cut line 31. Therefore, when the external force is applied, the center pin 30 is flattened out or broken, and the cut line 31 is opened outward. Accordingly, the corner 33 at the intersection of the cut line 31 and the first cutout 32 is projected and penetrates the separator 23. In the result, the cathode 21 and the anode 22 are surely short-circuited.

Further, in the secondary battery, the cathode exposed region 21D in which no cathode active material layer 21B is provided on the both faces of is provided on the spirally winding center side of the cathode 21. In addition, the anode exposed region 22D in which no anode active material layer 22B is provided on the both faces is provided on the spirally winding center side of the anode 22. Therefore, when the corner 33 penetrates the separator 23, between the cathode current collector 21A and the anode current collector 22A with the relatively low resistance are directly short-circuited. That is, in this embodiment, the cathode exposed region 21D of the cathode 21 and the anode exposed region 22D of the anode 22 are short-circuited by the corner 33 of the center pin 30, and no short-circuit is generated through the cathode active a material layer 21B with the high resistance. Therefore, temperature rise in the cathode active material layer 21B is prevented.

As above, in this embodiment, the first cutout 32 is provided to vertically cross the cut line 31 of the center pin 30. Therefore, when the external force is applied, the sharp-pointed corner 33 is projected outward to surely short-circuit the cathode 21 and the anode 22. Further, the cathode exposed region 21D in which no cathode active material layer 21B is provided on the both faces is provided particularly on the center side of the spirally wound electrode body 20. In addition, the anode exposed region 22D in which no anode active material layer 22B is provided on the both faces is provided particularly on the center side of the spirally wound electrode body 20. Therefore, when the corner 33 penetrates the separator 23, the cathode current collector 21A and the anode current collector 22A with the relative low resistance are directly short-circuited. Therefore, while temperature rise in the cathode active material layer 21B is prevented, the cathode 21 and the anode 22 are surely short-circuited and thereby the safety is improved.

In particular, when the anode 22 contains the anode active material that can insert and extract the electrode reactant and contains at least one of the metal elements and the metalloid elements as an element, the battery energy density is large and higher safety is demanded. Therefore, in this case, higher effects can be obtained.

Further, in this embodiment, by providing the second cutout 34 in addition to the first cutout 32 for the center pin 30, it is possible that when the external force is applied, the second cutout 34 is also opened outward and pressed onto the cathode 21 and the anode 22, and thereby short-circuit is easily generated. Further, by changing the size, the number and the like of the second cutouts 34, the strength of the center pin 30 can be adjusted.

Modification of First Embodiment

Figure 10:
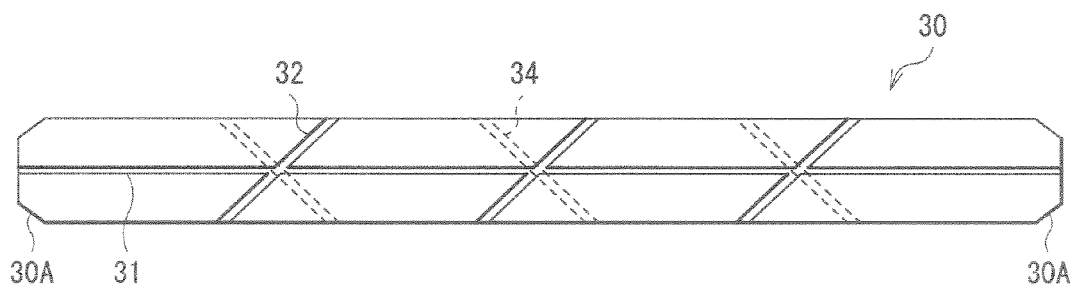
FIG. 10 is a plan view showing a modification of the center pin.
Figure 11:
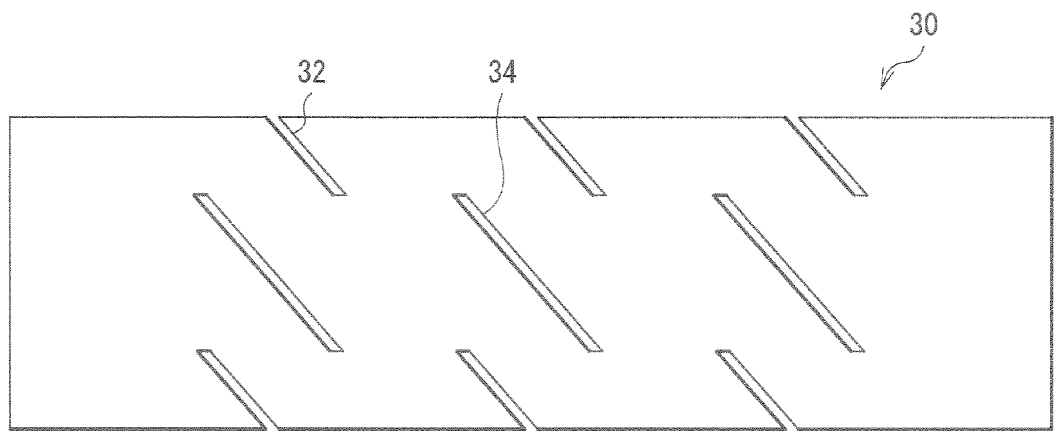
FIG. 11 is a plan view showing a structure exploded along a cut line of the center pin shown in FIG. 10.

FIG. 10 shows a modification of the foregoing center pin 30. FIG. 11 shows a structure that the center pin 30 is exploded along the cut line 31. As shown in the figures, it is possible that the first cutout 32 diagonally crosses the cut line 31 and the second cutout 34 is provided in the direction diagonally crossing the cut line 31. The second cutout 34 is not necessarily provided.

Figure 12:
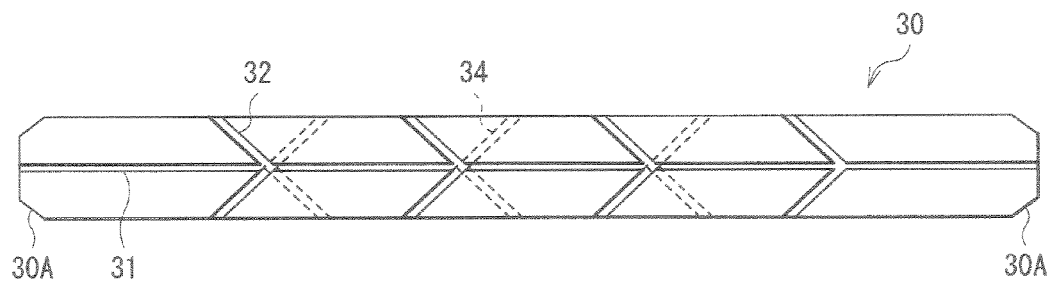
FIG. 12 is a plan view showing another modification of the center pin.
Figure 13:
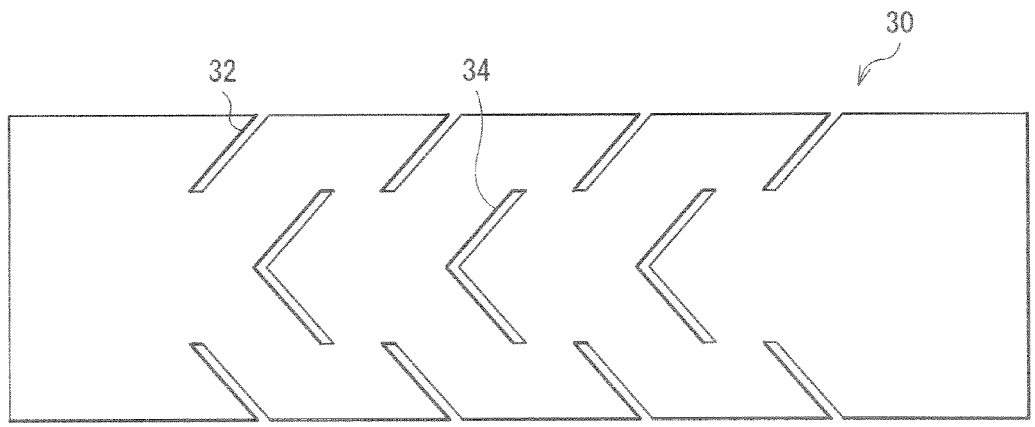
FIG. 13 is a plan view showing a structure exploded along a cut line of the center pin shown in FIG. 12.

FIG. 12 shows another modification of the center pin 30. FIG. 13 shows a structure that the center pin 30 is exploded along the cut line 31. As shown in the figures, it is enough that the first cutout 32 and the second cutout 34 are shaped so that the corner 33 is projected when flattened out or broken. The shape thereof is not limited to the linear shape as that in the first embodiment, but may be V-shaped. The second cutout 34 is not necessarily provided.

Figure 14:
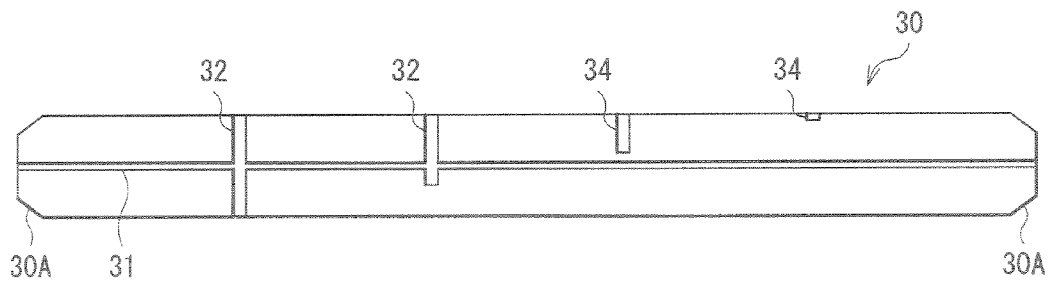
FIG. 14 is a plan view showing still another modification of the center pin.

FIG. 14 shows still another modification of the center pin 30. As shown in the figure, it is enough that the second cutout 34 is located deviated from the cut line 31 in the circumferential direction, and is not necessarily located at the position facing the cut line 31 in the circumferential direction as in the first embodiment. Further, it is not necessary that all second cutouts 34 are located in the same position in the circumferential direction, and the second cutouts 34 may be located in the position deviated from each other.

Second Embodiment

Figure 15:
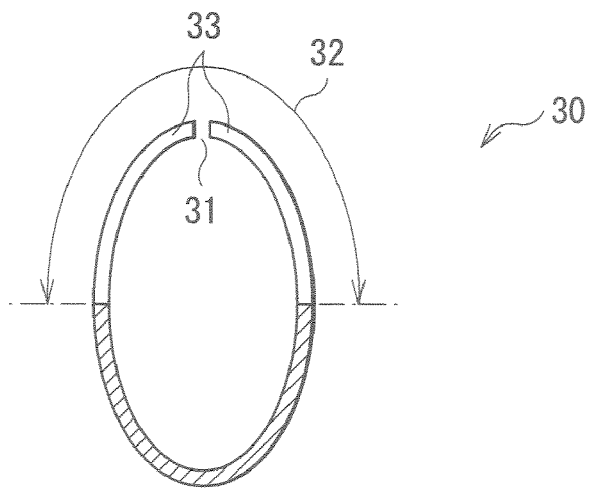
FIG. 15 is a cross section showing a structure of a center pin according to a second embodiment of the invention.

FIG. 15 shows a cross sectional structure of the center pin 30 of a secondary battery according to a second embodiment of the invention. The secondary battery has a structure, operations, and effects similar to those of the first embodiment, except that the cross sectional shape of the center pin 30 is oval and the cut line 31 is located in the long diameter of the oval. The secondary battery can be fabricated as in the first embodiment. Therefore, a description will be given in such a manner that elements identical with those of the first embodiment are affixed with the same symbol.

Figure 16A:
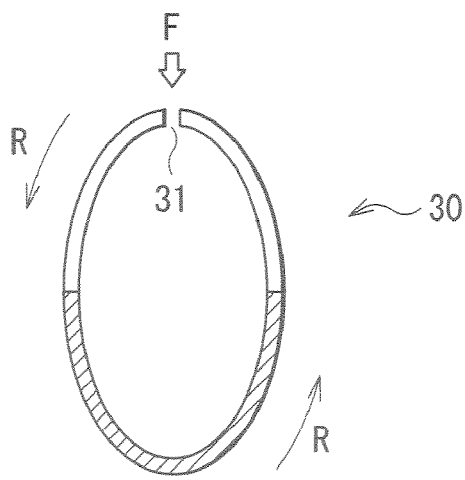
FIGS. 16A-16C are views for explaining an operation of the center pin shown in FIG. 15.
Figure 16B:
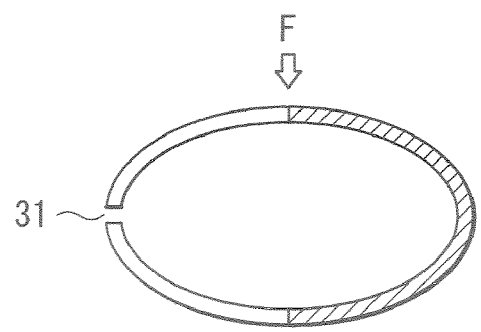
Figure 16C:
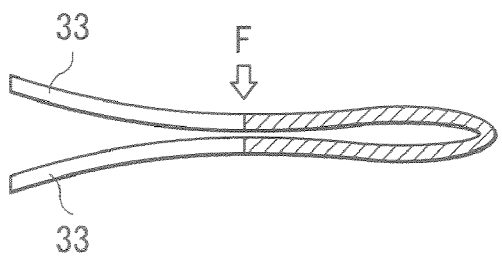

In the secondary battery, the cross sectional shape of the center pin 30 is oval and the cut line 31 is located in the long diameter of the oval. Therefore, for example, as shown in FIG. 16A, when the force F is applied from the direction identical with that of the long diameter of the oval, the center pin 30 is rotated inside the spirally wound electrode body 20 in the direction of the arrow R, for example. In the result, the posture of the center pin 30 becomes as shown in FIG. 16B, and the center pin 30 is flattened out in the direction of the short diameter of the oval as shown in FIG. 16C. Therefore, the cut line 31 is not flattened out flatly but opened outward, the corner 33 at the intersection of the cut line 31 and the first cutout 32 is projected, and the cathode 21 and the anode 22 are surely short-circuited.

As above, in this embodiment, the cross sectional shape of the center pin 30 is oval and the cut line 31 is located in the long diameter of the oval. Therefore, the center pin 30 is easily flattened out in the direction of the short diameter of the oval, and thus direction of deformation can be provided for the center pin 30. In the result, regardless of the direction of the applied force, the cut line 31 is not flattened out flatly but opened outward, and short-circuit can be surely generated.

Figure 17:
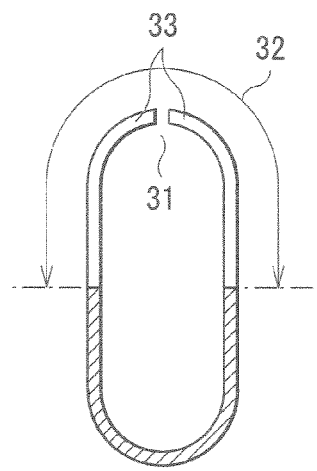
FIG. 17 is a cross section showing a modification of the center pin.

In this embodiment, the description has been given of the case that the cross sectional shape of the center pin 30 is oval. However, as shown in FIG. 17, it is possible that the cross sectional shape of the center pin 30 is ellipse, and the cut line 31 is located in the position where the diameter of the ellipse is the largest.

Further, as the secondary battery according to the foregoing modification, it is possible that the first cutout 32 diagonally crosses the cut line 31 and the second cutout 34 is provided in the direction diagonally crossing the cut line 31 (refer to FIG. 10 and FIG. 11). Further, it is enough that the first cutout 32 and the second cutout 34 are shaped so that the corner 33 can be projected when flattened out or broken. The shape thereof is not limited to the linear shape as in the first embodiment, but may be V-shaped (refer to FIG. 12 and FIG. 13). Further, it is enough that the second cutout 34 is located deviated from the cut line 31 in the circumferential direction (refer to FIG. 14), and the second cutout 34 is not necessarily located at the position facing the cut line 31 in the circumferential direction as in the first embodiment. Further, it is not necessary that all second cutouts 34 are located in the same position in the circumferential direction, and the second cutouts 34 may be located in the position deviated from each other.

Third Embodiment

Figure 18:
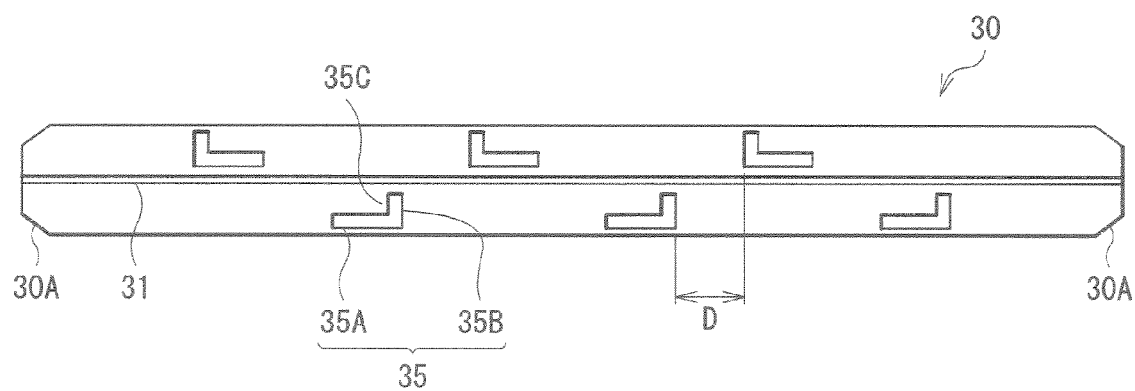
FIG. 18 is a plan view showing a structure of a center pin according to a third embodiment of the invention.

FIG. 18 shows a structure of the enter pin 30 of a secondary battery according to a third embodiment of the invention. The secondary battery has a structure similar to that of the first embodiment, except that a bent slit 35 is provided for the center pin 30. Therefore, a description will be given in such a manner that elements identical with those of the first embodiment are affixed with the same symbol.

The slit 35 has a linear first portion 35A and a linear second portion 35B that extends from an end of the first portion 35A in a direction different from the direction of the first portion 35A, for example, extends perpendicular to the direction of the first portion 35A. That is, the slit 35 is so called L-shaped, and has a convex portion 35C in the bent portion. Thereby, in the secondary battery, when flattened out by the external force, the slit 35 is projected outward and the bent convex portion 35C penetrates the separator 23. In the result, the cathode 21 and the anode 22 can be surely short-circuited. The corner of the slit 35 is not necessarily right-angled, but may be rounded off.

The length of the first portion 35A and the length of the second portion 35B, that is, the dimensions in the extending direction are preferably set to the degree with which the slit 35 can be surely projected, and for example, about the half circumference of the center pin 30. The width of the first portion 35A and the width of the second portion 35B, that is, the dimensions of the slit 35 in the direction perpendicular to the extending direction are preferably, for example, from 0.1 mm to 2.0 mm. Thereby, higher effects can be obtained. The length of the first portion 35A and the length of the second portion 35B are not necessarily identical.

It is preferable that the first portion 35A is parallel to the longitudinal direction of the center pin 30, and the second portion 35B extends from the end of the first portion 35A perpendicular to the first portion 35A. Thereby, the productivity can be improved.

The distance D between each slit 35 is preferably, for example, 0.1 mm or more. Thereby, the productivity can be improved.

Further, it is preferable that the odd number of the cuts 35 are arranged separately in the circumferential direction of the center pin 30. Thereby, the cuts 35 can be uniformly arranged over the entire center pin 30. The foregoing words, "the odd number of the cuts 35 are arranged separately" mean that the interval α between each slit 35 in the circumferential direction (angle made by two cuts 35 closest to each other in the circumferential direction to the center C of the center pin 30) is the angle obtained by dividing 360 deg by the odd number. Each interval α between each slit 35 in the circumferential direction is not necessarily identical completely with each other, but may be almost equal to each other. Further, the slit 35 is not necessarily on the identical circumference, but may be provided slightly deviated from each other in the longitudinal direction of the center pin 30.

Figure 19:
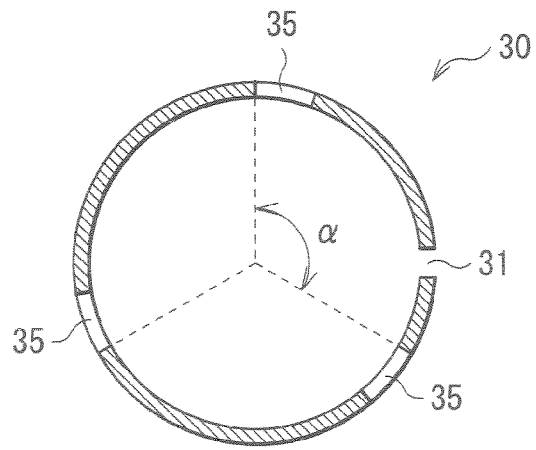
FIG. 19 is a view showing an example of arrangement of slits in the circumferential direction.
Figure 20:
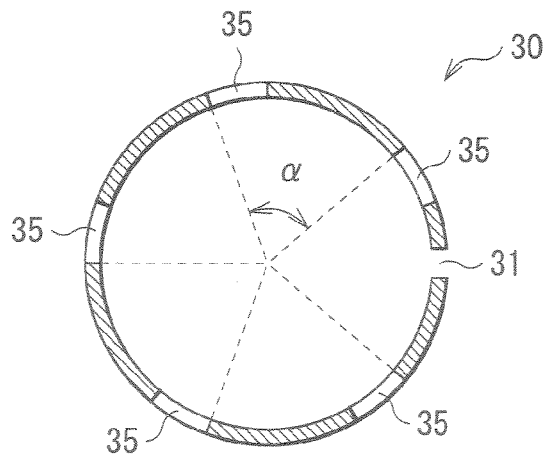
FIG. 20 is a view showing another example of arrangement of the slits.
Figure 21:
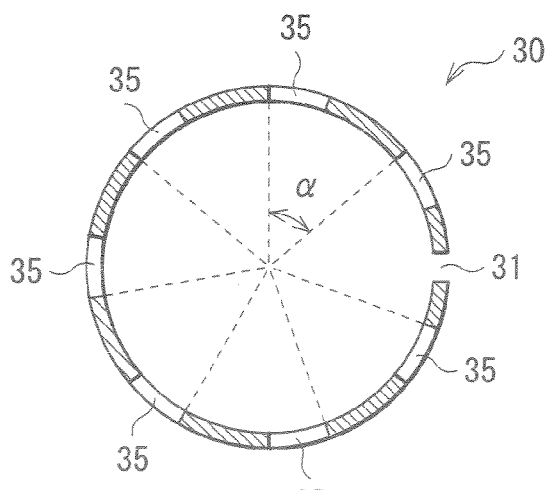
FIG. 21 is a view showing still another example of arrangement of the slits.

More specifically, as shown in FIG. 19, three cuts 35 may be separately arranged in the circumferential direction. Otherwise, as shown in FIG. 20, five cuts 35 may be separately arranged in the circumferential direction. Otherwise, as shown in FIG. 21, seven cuts 35 may be separately arranged in the circumferential direction. Specially, it is preferable to separately arrange the seven cuts 35. Thereby, arrangement variation of the cuts 35 is corrected, and thus the cathode 21 and the anode 22 can be surely short-circuited regardless of the direction of the applied external force. Meanwhile, when eight or more cuts 35 are arranged separately, the size of the slit 35 should be decreased. In the result, there is a possibility that sufficient effects are not able to be obtained.

The secondary battery can be fabricated as in the first embodiment, except that the center pin 30 is formed by providing the slit 35 for the plate 41 and then rolling the plate 41.

In the secondary battery, when the external force is applied to the secondary battery, the center pin 30 is flattened out, and the slit 35 is projected outward. The convex portion 35C of the slit 35 penetrates the separator 23, and thereby the cathode 21 and the anode 22 are surely short-circuited.

As above, in this embodiment, the slit 35 is provided for the center pin 30. Therefore, when flattened out or broken by the external force, the cathode 21 and the anode 22 can be surely short-circuited and thereby the safety is improved.

In particular, when the odd number of the cuts 35 are arranged separately in the circumferential direction of the center pin 30, in particular, when seven cuts 35 are separately arranged in the circumferential direction of the center pin 30, the cuts 35 can be uniformly arranged over the entire center pin 30, the cathode and the anode can be surely short-circuited regardless of the direction of the applied external force, and the safety can be further improved.

Modification of Third Embodiment

Figure 22:
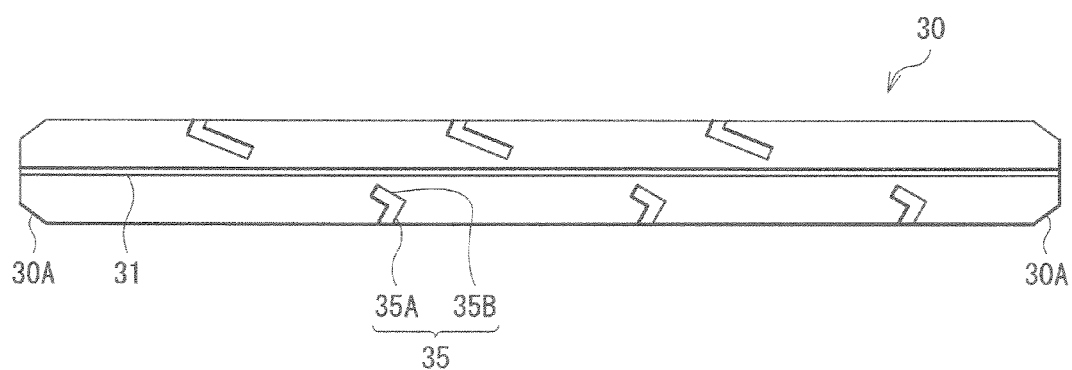
FIG. 22 is a plan view showing a modification of the center pin.

In this embodiment, the description has been given of the case that the cuts 35 are arranged at regular intervals. However, the cuts 35 may be arranged at irregular intervals. Further, in this embodiment, the description has been given of the case that the first portion 35A is parallel to the longitudinal direction of the center pin 30, and the second portion 35B is perpendicular to the first portion. However, as shown in FIG. 22, the first portion 35A and the second portion 35B may be arranged diagonally to the longitudinal direction of the center pin 30.

Figure 23:
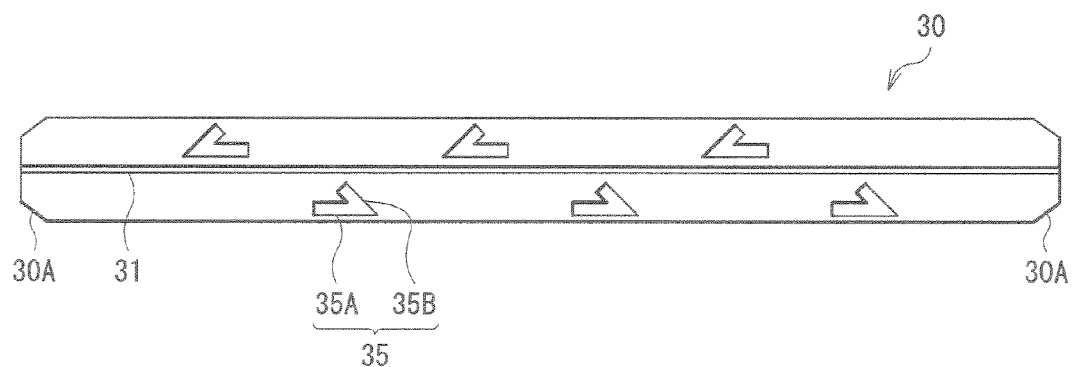
FIG. 23 is a plan view showing another modification of the center pin.

Further, in this embodiment, the description has been given of the case that the second portion 35B extends from the end of the first portion 35A perpendicular to the direction of the first portion 35A. However, as shown in FIG. 23, the second portion 35B may extend from the end of the first portion 35A at an acute angle to the first portion 35A. Further, it is possible that the second portion 35B extends from the end of the first portion 35A at an acute angle to the first portion 35A, and at the same time the first portion 35A and the second portion 35B are arranged diagonally to the longitudinal direction of the center pin 30.

Figure 24:
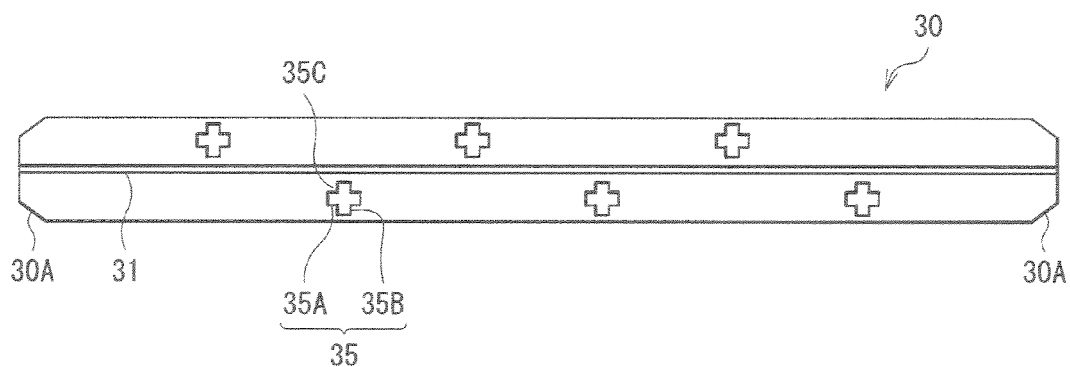
FIG. 24 is a plan view showing still another modification of the center pin.
Figure 25:
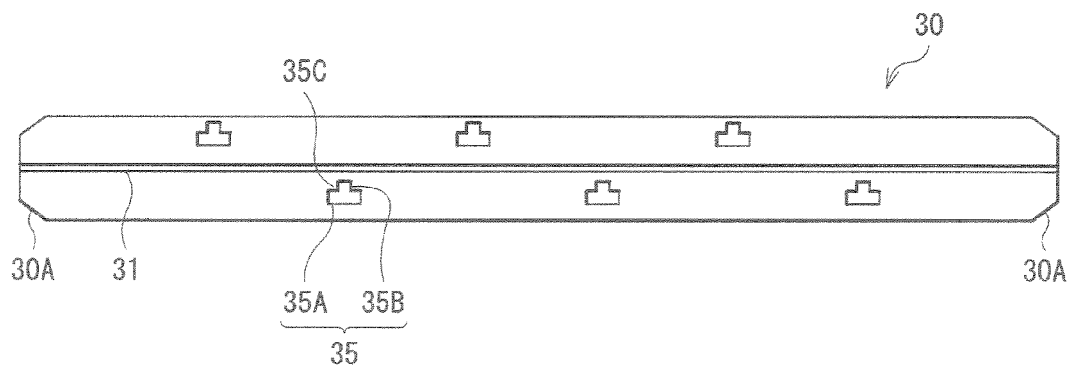
FIG. 25 is a plan view showing still another modification of the center pin.

In addition, the slit 35 may have the linear first portion 35A and the linear second portion 35B that crosses the first portion 35A. In this case, the second portion 35B may cross the first portion 35A in the shape of a cross as shown in FIG. 24, or in the shape of T as shown in FIG. 25. Further, the crossing angle of the first portion 35A and the second portion 35B is not necessarily the right angle, but may be an acute angle or an obtuse angle.

Figure 26:
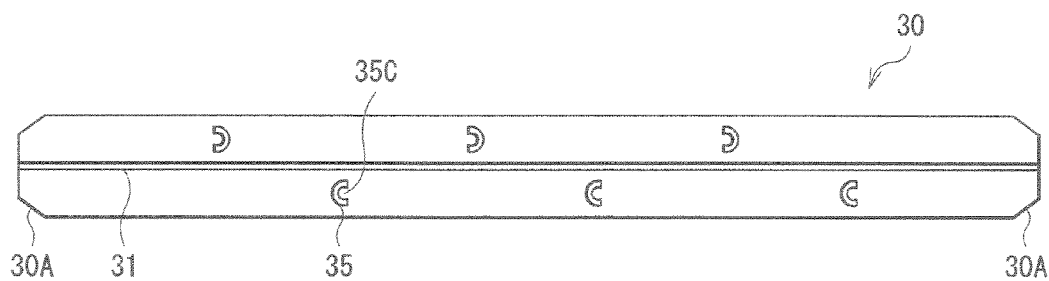
FIG. 26 is a plan view showing still another modification of the center pin.

Furthermore, the slit 35 not always has the straight line shape, but may have the roundly bent shape as shown in FIG. 26.

Fourth Embodiment

Figure 27:
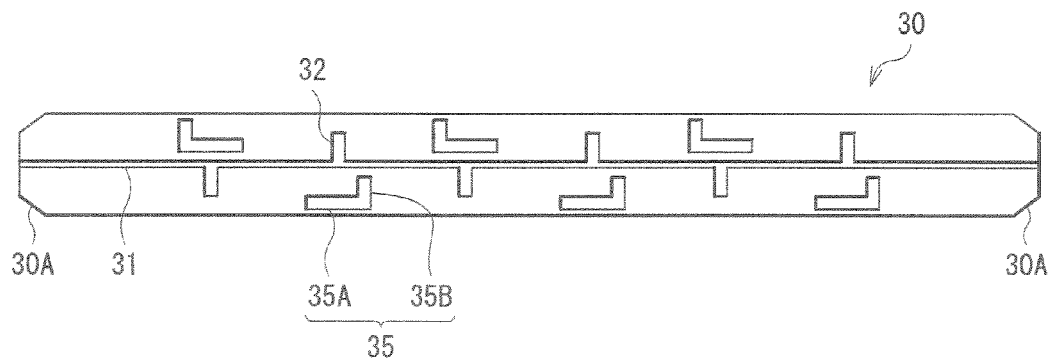
FIG. 27 is a plan view showing a structure of a center pin according to a fourth embodiment of the invention.

FIG. 27 shows a structure of the center pin 30 of a secondary battery according to a fourth embodiment of the invention. The secondary battery has a structure, operations, and effects similar to those of the third embodiment, except that not only the slit 35 is provided, but also the cutout 32 similar to the first cutout 32 of the first embodiment is provided to cross the cut line 31 of the center pin 30. The secondary battery can be fabricated as in the third embodiment.

The cutout 32 is structured as in the first embodiment, except that the cutout 32 is provided only on one side of the cut line 31.

In this embodiment, the slit 35 and the cutout 32 are provided for the center pin 30. Therefore, when flattened out or broken by the external force, the cathode 21 and the anode 22 can be surely short-circuited and thereby the safety is improved.

Figure 28:
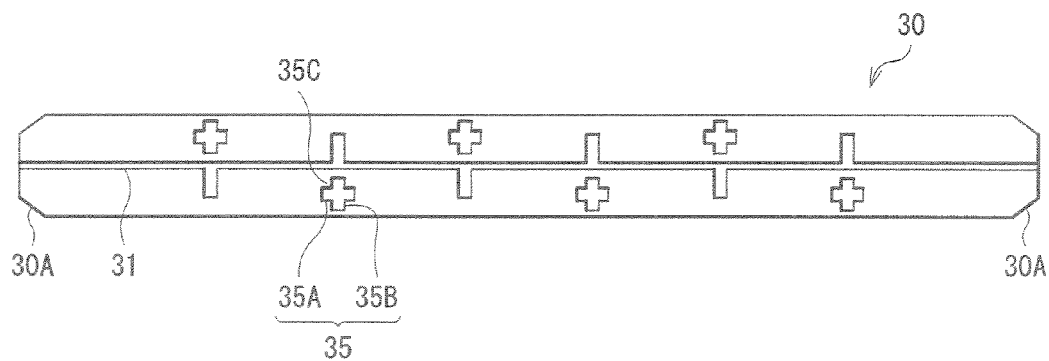
FIG. 28 is a plan view showing a modification of the center pin.

In this embodiment, the description has been given of the case that the slit 35 shown in FIG. 18 is provided for the center pin 30. However, the slit 35 in other shape described in the modification of the third embodiment may be provided. For example, as show in FIG. 28, the cross-shaped slit 35 shown in FIG. 24 may be provided.

Further, in this embodiment, the description has been given of the case that the slit 35 and the cutout 32 are provided to face each other with the cut line 31 in between. However, the slit 35 and the cutout 32 are not necessarily located at a position facing each other. In this case, the cutout 32 may be provided on the both sides of the cut line 31 as described in the first embodiment. Further, the cutout 32 may be in other shape described in the modification of the first embodiment.

Fifth Embodiment

Figure 29:
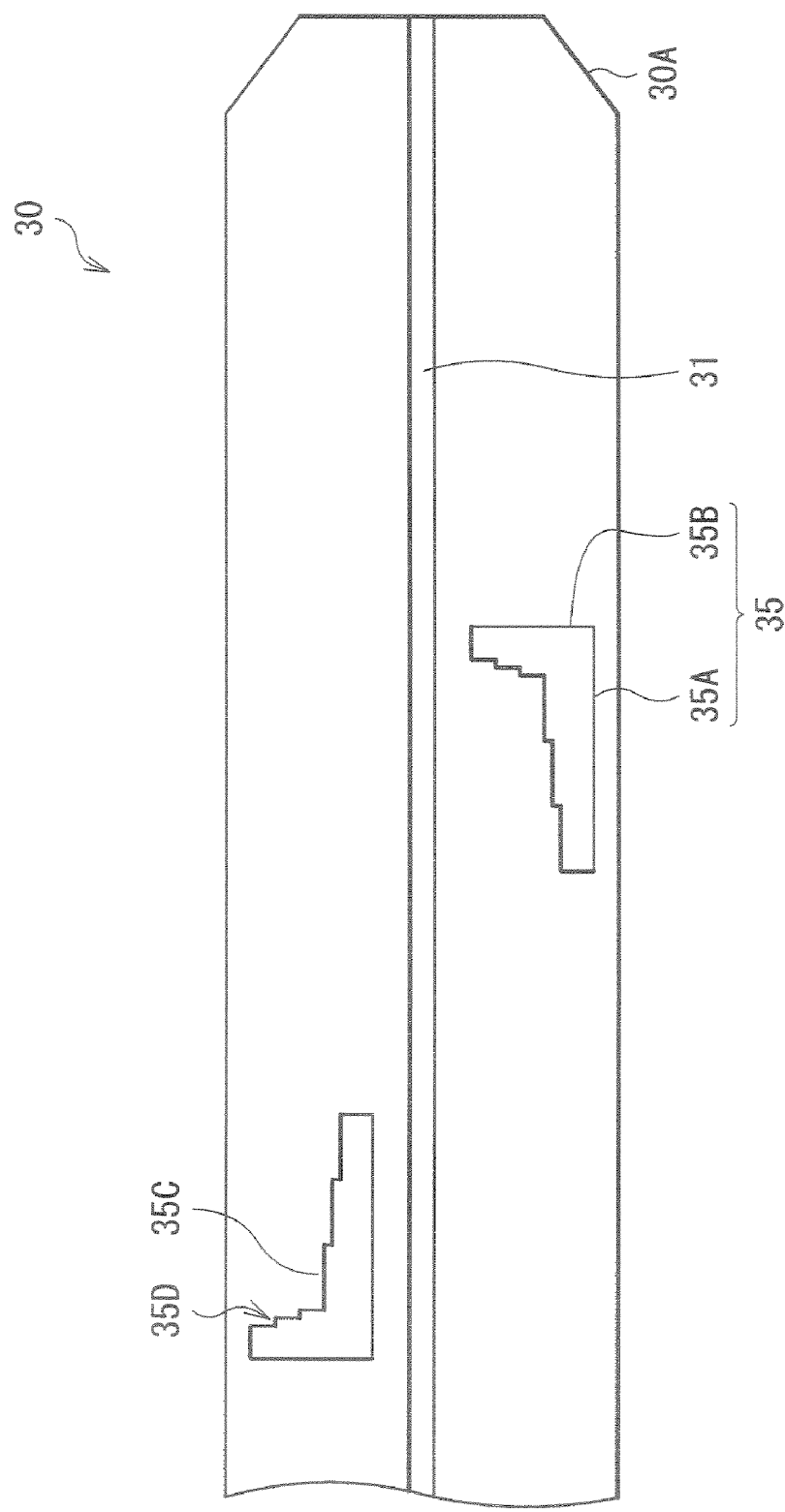
FIG. 29 is a plan view showing an enlarged slit of a center pin according to a fifth embodiment of the invention.

FIG. 29 is an enlarged view of the slit 35 of the center pin 30 of a secondary battery according to a fifth embodiment of the invention. In the secondary battery, a stepwise step 35D is provided in a side of the slit 35 of the center pin 30. Thereby, the convex portion 35C easily sticks into the separator 23, or sticks into the separator 23 more deeply, and thereby the cathode 21 and the anode 22 are more surely short-circuited. Except for such an aspect, the structure of the fifth embodiment is similar to that of the third embodiment. Therefore, a description will be given in such a manner that elements identical with those of the third embodiment are affixed with the same symbol.

It is enough that the step 35D is provided at least in a side of the convex portion 35C, but the step 35D may be provided in the entire sides of the slit 35. The shape, the angle and the like of the step 35D are not particularly limited, and may be, for example, sawtooth-shaped. Further, the step 35D may be a straight line or a curved line. In reality, it is difficult to form the corner angle of the step 35D into the totally straight lines. Therefore, the corner may be rounded off. The step 35D is preferably on the same level of the surface of the center pin 30, or oriented inward from the surface of the center pin 30. When the step 35D is projected outward from the surface of the center pin 30, there is a possibility that when the center pin 30 is inserted in the center of the spirally wound electrode body 20 in the manufacturing step, the separator 32 is damaged by the step 35D.

As above, in this embodiment, the step 35D is provided in the side of the slit 35 of the center pin 30. Therefore, the convex portion 35C easily sticks into the separator 23, or sticks into the separator 23 more deeply. In the result, the cathode 21 and the anode 22 can be more surely short-circuited and thereby the safety is further improved.

Sixth Embodiment

Figure 30A:
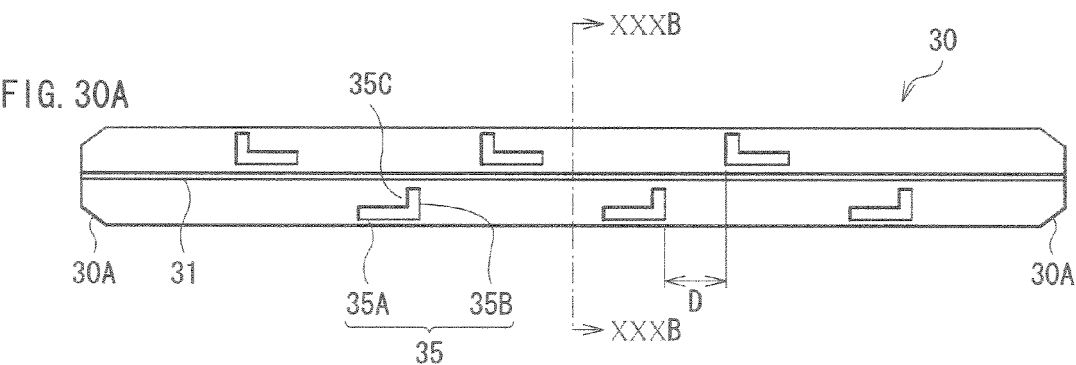
FIG. 30A is a plan view and FIG. 30B is a cross section showing a structure of a center pin according to a sixth embodiment of the invention.
Figure 30B:
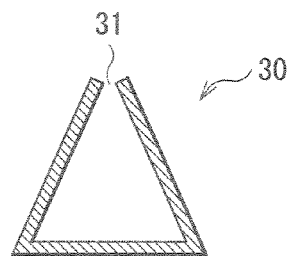

FIG. 30 shows a structure of the center pin 30 of a secondary battery according to a sixth embodiment of the invention. In the secondary battery, the cross sectional shape of the center pin 30 is triangle. Thereby, when the external force is applied, an apex of the triangle of the center pin 30 breaks into the separator 23, and thereby the cathode 21 and the anode 22 are short-circuited. Except for such an aspect, the structure, the operations, and the effects of the sixth embodiment are similar to those of the third embodiment, and the secondary battery of the sixth embodiment can be fabricated as in the third embodiment. Therefore, a description will be given in such a manner that elements identical with those of the third embodiment are affixed with the same symbol.

The position of the cut line 31 is not particularly limited, but is preferably in the apex of the triangle of the center pin 30. Thereby, when the external force is applied, the cut line 31 can be opened outward to break into the separator 23, and thereby the cathode 21 and the anode 22 can be more surely short-circuited.

As above, in this embodiment, the cross sectional shape of the center pin 30 is triangle. Therefore, when the external force is applied, short-circuit can be surely generated.

Figure 31:
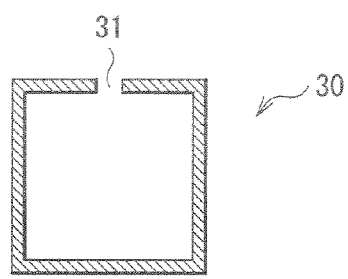
FIG. 31 is a cross section showing a modification of the center pin.

In this embodiment, the description has been given of the case that the cross sectional shape of the center pin 30 is triangle. However, the cross sectional shape of the center pin 30 nay be other polygon such as the rectangle as shown in FIG. 31 and a polygon having 5 or more apexes. Further, the cut line 31 is not necessarily provided in the apex, but may be provided in the flat portion as shown in FIG. 31.

EXAMPLES

Further, specific examples of the invention will be described in detail.

Examples 1-1 to 1-4

The secondary batteries described in the first embodiment and the modifications thereof were fabricated.

First, lithium carbonate ($Li_2CO_3$) and cobalt carbonate ($CoCO_3$) were mixed at a ratio of $Li_2CO_3:CoCo_3=0.5:1$ (mol ratio). The mixture was fired for 5 hours at 900 deg C. in the air to obtain lithium cobalt complex oxide ($LiCoO_2$) as a cathode active material. Next, 91 parts by weight of the lithium cobalt complex oxide and 6 parts by weight of graphite as a conductive agent, and 3 parts by weight of polyvinylidene fluoride as a binder were mixed to prepare a cathode mixture. Subsequently, the cathode mixture was dispersed in N-methyl-2-pyrrolidone as the solvent to form cathode mixture slurry. Both faces of the cathode current collector 21A made of an aluminum foil being 20 μm thick were uniformly coated with the cathode mixture slurry, which was then dried. The resultant was compression-molded by a rolling press machine to form the cathode active material layer 21B, and thereby the cathode 21 was formed. Subsequently, the cathode lead 25 made of aluminum was attached to one end of the cathode current collector 21A.

Further, a CoSnC-containing material was formed as an anode active material. First, as raw materials, cobalt powder, tin powder, and carbon powder were prepared. The cobalt powder and the tin powder were alloyed to form cobalt-tin alloy powder, to which the carbon powder was added and dry-blended. Subsequently, the mixture was synthesized in a planetary ball mill by using mechanochemical reaction to obtain a CoSnC-containing material.

The composition of the obtained CoSnC-containing material was analyzed. In the result, the cobalt content was 29.3 wt %, the tin content was 49.9 wt %, and the carbon content was 19.8 wt %. The carbon content was measured by a carbon sulfur analyzer. The cobalt content and the tin content were measured by ICP (Inductively Coupled Plasma) optical emission spectroscopy. Further, regarding the obtained CoSnC-containing material, X-ray diffraction was performed. In the result, the diffraction peak having the wide half bandwidth with the diffraction angle 2θ of 1.0 degree or more was observed in the range of the diffraction angle 2θ=20 to 50 degrees. Further, when XPS was performed for the CoSnC-containing material, the C1s peak in the CoSnC-containing material was obtained in the region lower than 284.5 eV. That is, it was confirmed that carbon in the CoSnC-containing material was bonded to other element.

Next, 60 parts by weight of the CoSnC-containing material, 28 parts by weight of an artificial graphite as a conductive agent and an anode active material, and 10 parts by weight of polyvinylidene fluoride as a binder were mixed to prepare an anode mixture. Subsequently, the anode mixture was dispersed in N-methyl-2-pyrrolidone as a solvent to obtain anode mixture slurry. Next, both faces of the anode current collector 22A made of a copper foil being 15 µm thick were coated with the anode mixture slurry, which was then dried. The resultant was compression-molded by a rolling press machine to form the anode active material layer 22B. After that, the anode lead 26 made of nickel was attached to one end of the anode current collector 22A.

Subsequently, the separator 23 made of a micro porous polypropylene film being 25 µm thick was prepared. Then, the cathode 21, the separator 23, the anode 22, and the separator 23 were layered in this order to form a lamination. After that, the lamination was spirally wound several times to form the spirally wound electrode body 20. The maximum diameter of the spirally wound electrode body 20 was 13.5 mm.

After the spirally wound electrode body 20 was formed, the thin strip-shaped plate 41 made of stainless steel was prepared. By wire-cutting the plate 41, the first cutout 32 and the second cutout 34 were formed. In Example 1-1, as shown in FIG. 4, one first cutout 32 was provided to vertically cross the cut line 31, and the second cutout 34 was not provided. In Example 1-2, as shown in FIG. 7, three first cutouts 32 were provided to vertically cross the cut line 31, and the second cutout 34 was not provided. In Example 1-3, as shown in FIG. 8, five first cutouts 32 were provided to vertically cross the cut line 31, and four second cutouts 34 were provided in the direction perpendicular to the cut line 31 in a position facing the cut line 31 in the circumferential direction. In Example 1-4, as shown in FIG. 10 and FIG. 11, three first cutouts 32 were provided to diagonally cross the cut line 31, and three second cutouts 34 were provided in the direction diagonally crossing the cut line 31.

After that, the plate 41 was rolled and formed into the cylindrical shape, and the slanted portions 30A were provided at the both ends thereof. Thereby, the center pin 30 was formed, and the center pin 30 was inserted in the center of the spirally wound electrode body 20.

After that, the spirally wound electrode body 20 was sandwiched between the pair of insulating plates 12 and 13, the anode lead 25 was welded to the battery can 11, the cathode lead 24 was welded to the safety valve mechanism 15, and the spirally wound electrode body 20 was contained inside the battery can 11 being 14.0 mm in internal diameter. After that, an electrolytic solution was injected into the battery can 11. As the electrolytic solution, a solution obtained by dissolving 1 mol/dm$^3$ of LiPF$_6$ as an electrolyte salt in a mixed solvent of 50 volume % of ethylene carbonate and 50 volume % of diethyl carbonate was used.

After the electrolytic solution was injected into the battery can 11, the battery cover 14 was fixed by being caulked through the gasket 17. In the result, the cylindrical secondary battery being 14 mm in external diameter and being 43 mm high was obtained.

Example 2

The secondary battery described in the second embodiment was fabricated. That is, as shown in FIG. 15, the secondary battery was fabricated as in Example 1-3, except that the cross sectional shape of the center pin 30 was oval and the cut line 31 was located in the long diameter of the oval.

Figure 34:
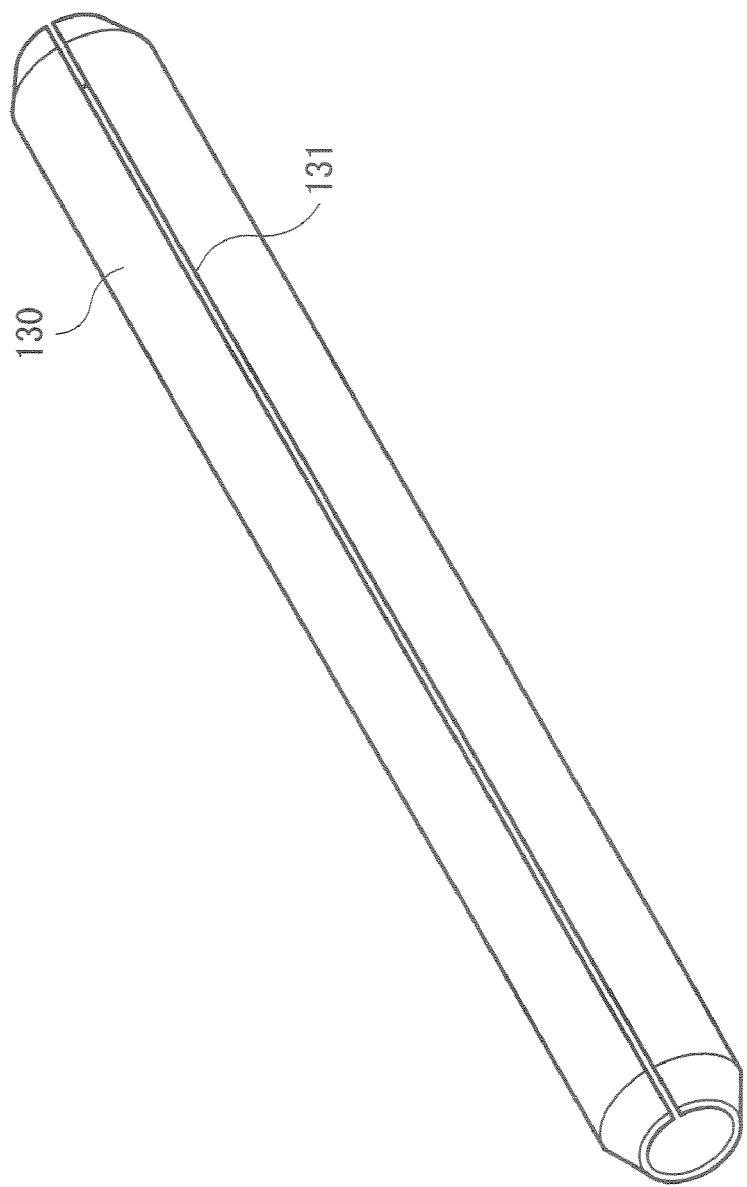
FIG. 34 is a perspective view showing an example of an existing center pin.

As Comparative example 1 relative to Examples 1-1 to 1-4 and Example 2, a secondary battery was fabricated as in Examples 1-1 to 1-4, except that the existing center pin that has only the cut line 131 and does not have the first cutout and the second cutout as shown in FIG. 34 was used.

Five secondary batteries (battery 1 to battery 5) obtained as above were fabricated respectively for Examples 1-1 to 1-4, Example 2, and the comparative example. Crush test was performed for these batteries to examine presence of ignition and explosion. The obtained results are shown Table 1.

TABLE 1

|  | Cross sectional shape | First cutout Direction | First cutout Number | Second cutout Direction | Second cutout Number | Battery 1 | Battery 2 | Battery 3 | Battery 4 | Battery 5 |
| --- | --- | --- | --- | --- | --- | --- | --- | --- | --- | --- |
| Example 1-1 | Circle | Vertical | 1 | — | 0 | Not Exploded | Not Exploded | Not Exploded | Not Exploded | Not Exploded |
| Example 1-2 | Circle | Vertical | 3 | — | 0 | Not Exploded | Not Exploded | Not Exploded | Not Exploded | Not Exploded |
| Example 1-3 | Circle | Vertical | 5 | Vertical | 4 | Not Exploded | Not Exploded | Not Exploded | Not Exploded | Not Exploded |
| Example 1-4 | Circle | Diagonal | 3 | Diagonal | 3 | Not Exploded | Not Exploded | Not Exploded | Not Exploded | Not Exploded |
| Example 2 | Oval | Vertical | 5 | Vertical | 4 | Not Exploded | Not Exploded | Not Exploded | Not Exploded | Not Exploded |
| Comparative example 1 | Circle | — | 0 | — | 0 | Exploded | Exploded | Exploded | Exploded | Exploded |

As evidenced by Table 1, according to Examples 1-1 to 1-4 and Example 2 having the first cutout 32 crossing the cut line 31, there was no explosion. Meanwhile, in the comparative example with no first cutout provided, all five secondary batteries were exploded. That is, it was found that when the center pin 30 was provided with the first cutout 32 crossing the cut line 31, the safety could be improved even if the battery was flattened out or broken to cause short-circuit.

Example 3

The secondary battery described in the third embodiment was fabricated. That is, the secondary battery was fabricated as in Examples 1-1 to 1-4, except that the L-shaped bent slit 35 was provided for the center pin 30 as shown in FIG. 18.

Examples 4-1 and 4-2

The secondary batteries described in the fourth embodiment were fabricated. That is, the secondary battery was fabricated as in Examples 1-1 to 1-4, except that the slit 35 and the cutout 32 were provided for the center pin 30. In Example 4-1, the L-shaped slit 35 shown in FIG. 27 was provided, and in Example 4-2, the cross-shaped slit 35 shown in FIG. 28 was provided.

Example 5

The secondary battery described in the fifth embodiment was fabricated. That is, the secondary battery was fabricated as in Examples 1-1 to 1-4, except that the stepwise step 35D was provided in a side of the slit 35 of the center pin 30 as shown in FIG. 29.

Example 6

The secondary battery described in the sixth embodiment was fabricated. That is, the secondary battery was fabricated as in Examples 1-1 to 1-4, except that the L-shaped bent slit 35 was provided for the center pin 30 with the triangle cross section.

Five secondary batteries (battery 1 to battery 5) obtained as above were fabricated respectively for Examples 3, 4-1 to 4-2, 5, and 6. Crush test was performed for these batteries to examine presence of ignition and explosion. Further, for Examples 3 and 5, short-circuit duration (time until short-circuit) was examined. The short-circuit duration was obtained by measuring the duration for each of five batteries and obtaining the average thereof. The obtained results are shown in Table 2. Comparative example 2 is the same as Comparative example 1.

TABLE 2

| | Cross sectional shape | Slit | Step | Cutout | Presence of explosion | | | | | Short-circuit duration (sec) |
|---|---|---|---|---|---|---|---|---|---|---|
| | | | | | Battery 1 | Battery 2 | Battery 3 | Battery 4 | Battery 5 | |
| Example 3 | Circle | L | Not provided | Not provided | Not exploded | Not exploded | Not exploded | Not exploded | Not exploded | 0.076 |
| Example 4-1 | Circle | L | Not provided | Provided | Not exploded | Not exploded | Not exploded | Not exploded | Not exploded | |
| Example 4-2 | Circle | Cross | Not provided | Provided | Not exploded | Not exploded | Not exploded | Not exploded | Not exploded | |
| Example 5 | Circle | L | Provided | Not provided | Not exploded | Not exploded | Not exploded | Not exploded | Not exploded | 0.072 |
| Example 6 | Triangle | L | Not provided | Not provided | Not exploded | Not exploded | Not exploded | Not exploded | Not exploded | |
| Comparative example 2 | Circle | Not provided | Not provided | Not provided | Exploded | Exploded | Exploded | Exploded | Exploded | |

As evidenced by Table 2, according to Examples 3, 4-1, 4-2, 5, and 6 having the slit 35, there was no explosion. Meanwhile, in Comparative example with no slit provided, all five secondary batteries were exploded. That is, it was found that when the center pin 30 was provided with the bent slit 35, the safety could be improved even if the battery was flattened out or broken to cause short-circuit.

Further, when Example 3 is compared to Example 5, Example 5 provided with the step 35D in the side of the slit 35 was short-circuited shorter than Example 3 provided with no step 35D. That is, it was found that when the step 35D was provided in the side of the slit 35, the cathode 21 and the anode 22 could be short-circuited more rapidly, and the safety could be improved more.

Examples 7-1 to 7-4

The secondary batteries described in the third embodiment were fabricated as in Examples 1-1 to 1-4, except that two cuts 35 were arranged separately in the circumferential direction in Example 7-1, three cuts 35 were arranged separately in the circumferential direction in Example 7-2, five cuts 35 were arranged separately in the circumferential direction in Example 7-3, and seven cuts 35 were arranged separately in the circumferential direction in Example 7-4.

Five secondary batteries (battery 1 to battery 5) obtained as above were fabricated respectively for Examples 7-1 to 7-4. Crush test was performed for these batteries to check presence of ignition and explosion. The obtained results are shown in Table 3. Comparative example 3 is the same as Comparative example 1.

TABLE 3

| | Number of cuts | Presence of explosion | | | | |
|---|---|---|---|---|---|---|
| | | Battery 1 | Battery 2 | Battery 3 | Battery 4 | Battery 5 |
| Example 7-1 | 2 | Not exploded | Not exploded | Exploded | Exploded | Exploded |
| Example 7-2 | 3 | Not exploded | Not exploded | Not exploded | Exploded | Exploded |
| Example 7-3 | 5 | Not exploded | Not exploded | Not exploded | Not exploded | Exploded |
| Example 7-4 | 7 | Not exploded | Not exploded | Not exploded | Not exploded | Not exploded |
| Comparative example 3 | 0 | Exploded | Exploded | Exploded | Exploded | Exploded |

As evidenced by Table 3, in all Examples 7-1 to 7-4, explosion could be suppressed compared to Comparative example 3. When comparing Examples 7-1 to 7-4 to each other, the higher the arrangement density of the slit 35 was, the lower the explosion ratio was. In particular, in Example 7-4 in which seven cuts 35 were separately arranged, there was no explosion. That is, it was found that when seven cuts 35 were separately arranged in the circumferential direction of the center pin 30, higher effects could be obtained.

Figure 32A:
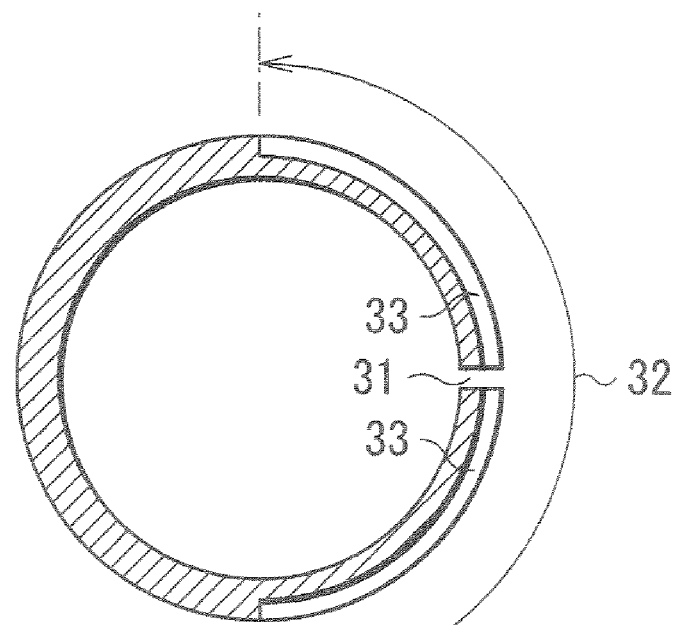
FIGS. 32A and 32B are cross sections showing a modification of the first cutout shown in FIG. 5 or a second cutout.
Figure 32B:
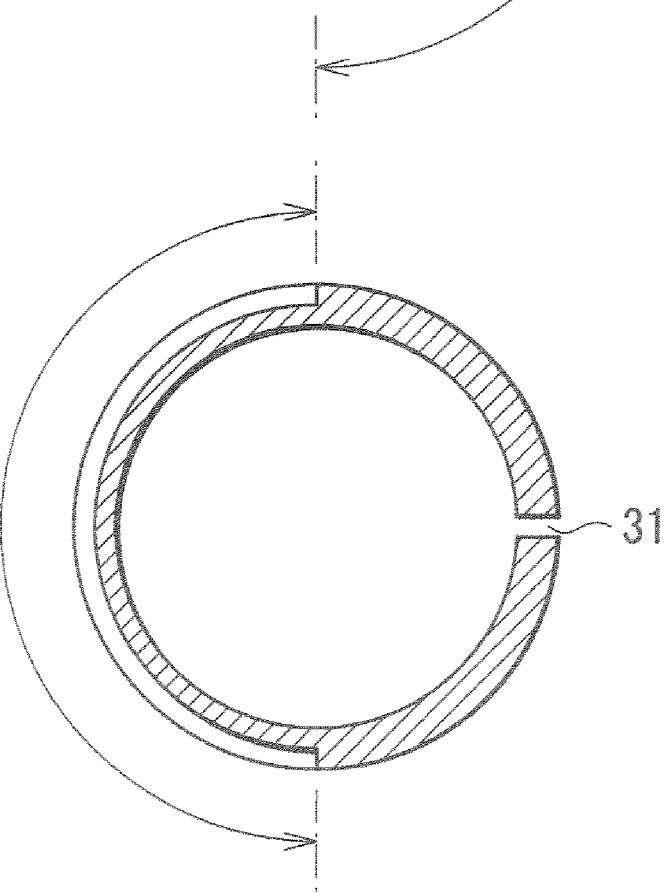

The invention has been described with reference to the embodiments and the examples. However, the invention is not limited to the embodiments and the examples, and various modifications may be made. For example, in the foregoing embodiments and the foregoing examples, the descriptions have been given of the case in which the first cutout 32 and the second cutout 34 are the holes penetrating the center pin 30 in the thickness direction. However, as shown in FIG. 32, the first cutout 32 and the second cutout 34 may be the thin groove obtained by reducing the thickness of part of the center pin 30 in the thickness direction. The same may be applied to the slit 35.

Figure 33:
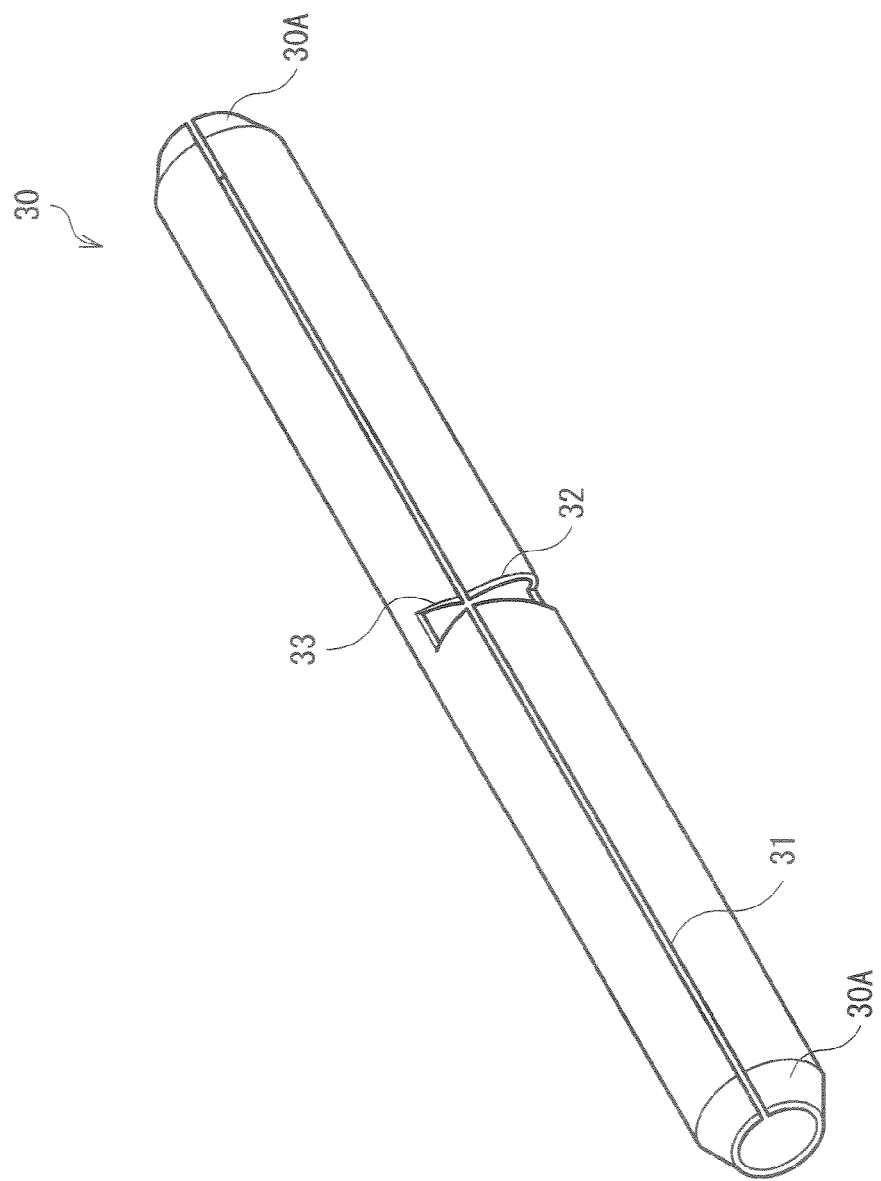
FIG. 33 is a perspective view showing a modification of the center pin.

Further, for example, it is enough that the shape of the first cutout 32 is a shape with which the first cutout 32 is connected with the cut line 31 and the corner 33 is formed at the intersection thereof. Therefore, the shape of the first cutout 32 is not limited to the linear shape described in the foregoing embodiments and the foregoing examples, and, for example, as show in FIG. 33, may be the butterfly-shape composed of two triangles symmetric centering on the cut line 31.

Further, in the foregoing embodiments and the foregoing examples, the descriptions have been given of the case using the electrolytic solution as a liquid electrolyte for the solvent. However, other electrolyte may be used instead of the electrolytic solution. As other electrolyte, for example, a gelatinous electrolyte in which the electrolytic solution is held in a polymer compound, a solid electrolyte having ion conductivity, a mixture of a solid electrolyte and an electrolytic solution, or a mixture of a solid electrolyte and a gelatinous electrolyte can be cited.

For the gelatinous electrolyte, various polymer compounds can be used as long as the polymer compound can absorb and gelate the electrolytic solution. As the polymer compound, a fluorinated polymer compound such as polyvinylidene fluoride and a copolymer of vinylidene fluoride and hexafluoropropylene, an ether polymer compound such as polyethylene oxide and a cross-linked body containing polyethylene oxide, polyacrylonitrile or the like can be cited. In particular, in terms of redox stability, the fluorinated polymer compound is desirable.

As a solid electrolyte, for example, an organic solid electrolyte in which an electrolyte salt is dispersed in a polymer compound having ion conductivity, or an inorganic solid electrolyte formed of ion conductive glass, ionic crystal or the like can be used. As the polymer compound, for example, an ether polymer compound such as polyethylene oxide and a cross-linked body containing polyethylene oxide, an ester polymer compound such as poly methacrylate, or an acrylate polymer compound can be used singly, by mixing, or by copolymerization in a molecule. As the inorganic slid electrolyte, lithium nitride, lithium iodide or the like can be used.

In addition, in the foregoing embodiments and the foregoing examples, the descriptions have been give of the cylindrical secondary battery having the spirally wound structure. However, the invention can be applied to a second battery having any shape as long as the secondary battery has a spirally wound structure. Further, the invention can be also applied to a primary battery.

Furthermore, in the foregoing embodiments and the foregoing examples, the descriptions have been given of the case using lithium as an electrode reactant. However, the invention can be also applied to the case using other Group 1 element in the long period periodic table such as sodium (Na) and potassium (K); a Group 2 element in the long period periodic table such as magnesium and calcium (Ca); other light metal such as aluminum, or an alloy of lithium or the foregoing elements, and similar effects can be obtained. At that time, for an anode active material capable of inserting and extracting an electrode reactant, a cathode active material, a solvent or the like can be selected according to the electrode reactant.

The invention claimed is:

1. A battery comprising:
    a spirally wound electrode body obtained by layering and spirally winding a cathode, and an anode with a separator in between, the cathode having a cathode active material layer on a face of a strip-shaped cathode current collector, and the anode having an anode active material layer on a face of a strip-shaped anode current collector; and
    a tubular center pin that is arranged in a center of the spirally wound electrode body, the center pin including:
    a cut line in a longitudinal direction of the center pin formed by first sectional cuts through a wall thickness of the center pin, and
    a first cutout which is cut from the center pin and formed by second sectional cuts through the wall thickness of the center pin, wherein
    sectional surfaces of the second sectional cuts face each other,
    the sectional surfaces of the second sectional cuts intersect with the cut line, and
    a width of a gap between the sectional surfaces of the second sectional cuts which face each other is 0.1 mm to 2.0 mm.

2. The battery according to claim 1, wherein the first cutout of the center pin vertically crosses the cut line.

3. The battery according to claim 1, wherein the first cutout of the center pin diagonally crosses the cut line.

4. The battery according to claim 1 comprising a second cutout that extends in a direction crossing the cut line in a position deviated from the cut line of the center pin in a circumferential direction.

5. The battery according to claim 4, wherein the second cutout of the center pin is located at a position facing the cut line in the circumferential direction.

6. The battery according to claim 1, wherein the center pin has a cross sectional shape of an oval or an ellipse, and the cut line is provided where a diameter of the oval or the ellipse is the largest.

7. The battery according to claim 1, wherein a thickness of the center pin is from 0.05 mm to 5 mm.

8. The battery according to claim 1, wherein
the cathode has a cathode exposed region in which no cathode active material layer is provided on both faces of the cathode current collector at an end of the cathode current collector on a center side of the spirally wound electrode body, and
the anode has an anode exposed region in which no anode active material layer is provided on both faces of the anode current collector at an end of the anode current collector on the center side of the spirally wound electrode body.

9. The battery according to claim 1, wherein the anode contains an anode active material that can insert and extract an electrode reactant and contains at least one of metal elements and metalloid elements as an element.

10. The battery according to claim 9, wherein the anode contains, as the anode active material, a material containing at least one of tin (Sn) and silicon (Si) as an element.

11. The battery according to claim 9, wherein the anode contains, as the anode active material, a material that tin (Sn), cobalt (Co), and carbon (C) as elements and has a carbon content of from 9.9 wt % to 29.7 wt %, and a ratio of cobalt to a total of tin and cobalt of from 30 wt % to 70 wt %.

12. A center pin having a tubular shape for a spirally wound electrode body of a battery having a spirally wound structure, the center pin comprising:
a cut line in a longitudinal direction of the center pin formed by first sectional cuts through a wall thickness of the center pin; and
a first cutout which is cut from the center pin and formed by second sectional cuts through the wall thickness of the center pin, wherein
sectional surfaces of the second sectional cuts face each other,
the sectional surfaces of the second sectional cuts intersect with the cut line, and
a width of a gap between the sectional surfaces of the second sectional cuts which face each other is 0.1 mm to 2.0 mm.

13. The center pin according to claim 12, wherein the first cutout vertically crosses the cut line.

14. The center pin according to claim 12, wherein the first cutout diagonally crosses the cut line.

15. The center pin according to claim 12 comprising a second cutout that extends in a direction crossing the cut line in a position deviated from the cut line in a circumferential direction.

16. The center pin according to claim 15, wherein the second cutout is located at a position facing the cut line in the circumferential direction.

17. The center pin according to claim 12 having a cross sectional shape of an oval or an ellipse, wherein the cut line is provided where a diameter of the oval or the ellipse is the largest.

18. The center pin according to claim 12 having a thickness of from 0.05 mm to 5 mm.

19. The battery according to claim 1, wherein the second sectional cuts have lengths in a circumferential direction of the center pin that are set so that when the battery is subjected to an external force, the center pin is flattened and one of the second sectional cuts is opened outward to penetrate the separator to cause the cathode and the anode to short-circuit.

20. The battery according to claim 1, wherein a length of one of the second sectional cuts is equal to at least half of a circumference of the center pin.

21. The battery according to claim 1, wherein the sectional surfaces of the second sectional cuts intersect with the cut line so as to form a sharp corner with sectional surfaces of the first sectional cuts.

22. The battery according to claim 1, wherein the second sectional cuts form at least one slit which crosses the cut line.

* * * * *